United States Patent
Rao et al.

(10) Patent No.: US 12,174,331 B1
(45) Date of Patent: Dec. 24, 2024

(54) PROJECTION-BASED EMBEDDED DISCRETE FRACTURE MODEL USING HYBRID OF TWO-POINT FLUX APPROXIMATION AND MIMETIC FINITE DIFFERENCE (TPFA-MFD) METHOD

(71) Applicant: YANGTZE UNIVERSITY, Jingzhou (CN)

(72) Inventors: Xiang Rao, Wuhan (CN); Xupeng He, Dammam (SA); Kou Du, Nanjing (CN); Mengna Cheng, Wuhan (CN); Shuqing Guo, Wuhan (CN)

(73) Assignee: YANGTZE UNIVERSITY (CN)

( * ) Notice: Subject to any disclaimer, the term of this patent is extended or adjusted under 35 U.S.C. 154(b) by 0 days.

(21) Appl. No.: 18/617,696

(22) Filed: Mar. 27, 2024

(30) Foreign Application Priority Data

Jul. 17, 2023 (CN) .......................... 202310879050.0

(51) Int. Cl.
  *G01V 20/00* (2024.01)
  *G01V 1/28* (2006.01)
  (Continued)

(52) U.S. Cl.
  CPC .............. *G01V 20/00* (2024.01); *G06F 30/28* (2020.01); *G01V 1/282* (2013.01); *G01V 1/301* (2013.01);
  (Continued)

(58) Field of Classification Search
  None
  See application file for complete search history.

(56) References Cited

U.S. PATENT DOCUMENTS

| | | | |
|---|---|---|---|
| 9,026,416 B2 * | 5/2015 | Mallison | G06F 30/23 703/10 |
| 9,068,448 B2 * | 6/2015 | Hui | G06F 30/28 |

(Continued)

OTHER PUBLICATIONS

Li, Longlong; Abushaikha, Ahmad., A fully-implicit parallel framework for complex reservoir simulation with mimetic finite difference discretization and operator-based linearization, Computational Geosciences26.4: 915-931. Springer Nature B.V. ; Aug. 2022 (Year: 2022).*

(Continued)

*Primary Examiner* — Akash Saxena

(57) ABSTRACT

This invention presents a projection embedded discrete fracture model integrating a TPFA and MFD hybrid approach, creating a pEDFM framework for various anisotropic two-phase flow situations. It specifies the distribution of extra pressure freedoms on matrix grids for MFD implementation, maintains f-f connections in TPFA through a standard pEDFM workflow, and introduces a low-conductivity fracture treatment for MFD. It also outlines the derivation of numerical flux calculation formulas for effective m-m and m-f connections. The mixed TPFA-MFD design applies to numerical flux estimation across both K-orthogonal and non-K-orthogonal grids, enhancing computational efficiency and facilitating the spatial discretization of continuity equations for matrix and fracture grids under anisotropic permeability conditions. A global equation system is formulated based on the continuity of effective connections, with time discretization via the implicit backward Euler method and pressure and water saturation distributions determined by a Newton-Raphson based nonlinear solver.

6 Claims, 13 Drawing Sheets a case 1    b case 1 c conforming mesh in DFM    d non-conforming mesh in the novel pEDFM

(51) Int. Cl.
  *G01V 1/30* (2006.01)
  *G06F 17/17* (2006.01)
  *G06F 30/23* (2020.01)
  *G06F 30/28* (2020.01)
  *G06F 111/10* (2020.01)

(52) U.S. Cl.
  CPC .... *G01V 2210/646* (2013.01); *G01V 2210/66* (2013.01); *G06F 17/175* (2013.01); *G06F 30/23* (2020.01); *G06F 2111/10* (2020.01)

(56) References Cited

U.S. PATENT DOCUMENTS

| | | | | |
|---|---|---|---|---|
| 11,294,095 B2* | 4/2022 | Mustapha | ............... | G01V 20/00 |
| 2002/0013687 A1* | 1/2002 | Ortoleva | ................ | G01V 11/00 703/10 |
| 2004/0015295 A1* | 1/2004 | Bratvedt | ................ | E21B 49/00 702/13 |
| 2008/0133186 A1* | 6/2008 | Li | ........................... | G06F 30/23 703/2 |
| 2009/0281776 A1* | 11/2009 | Cheng | .................... | E21B 49/00 703/2 |
| 2010/0138202 A1* | 6/2010 | Mallison | ................. | G01V 1/18 703/10 |
| 2010/0286968 A1* | 11/2010 | Parashkevov | ........... | G06F 30/23 703/2 |
| 2011/0082676 A1* | 4/2011 | Bratvedt | ................ | G06F 30/28 703/10 |
| 2012/0179436 A1* | 7/2012 | Fung | ...................... | G01V 99/00 703/2 |
| 2013/0231907 A1* | 9/2013 | Yang | ..................... | G01V 20/00 703/2 |
| 2014/0046636 A1* | 2/2014 | Mustapha | ............... | E21B 43/26 703/2 |
| 2014/0136171 A1* | 5/2014 | Sword, Jr. | .............. | G01V 11/00 703/10 |
| 2017/0074770 A1* | 3/2017 | Fourno | ................... | E21B 49/00 |
| 2017/0316128 A1* | 11/2017 | Huang | ................... | G01V 20/00 |
| 2018/0232950 A1* | 8/2018 | Brewer | ................. | G01V 20/00 |
| 2019/0212469 A1* | 7/2019 | Jonsthovel | ............... | G01V 3/18 |
| 2019/0309603 A1* | 10/2019 | Sepehrnoori | ........... | E21B 49/00 |
| 2019/0353825 A1* | 11/2019 | Tene | ....................... | G06F 30/23 |
| 2020/0200929 A1* | 6/2020 | Sepehrnoori | ........... | G06F 17/16 |
| 2021/0382193 A1* | 12/2021 | Miao | ...................... | G01V 1/301 |
| 2023/0097859 A1* | 3/2023 | AlSinan | ................. | G01V 20/00 703/6 |
| 2023/0125944 A1* | 4/2023 | Abushaika | ............. | G01V 20/00 703/10 |

OTHER PUBLICATIONS

Antonietti, Paola F; Formaggia, Luca; Scotti, Anna; Verani, Marco; Verzott, Nicola. ESAIM. Mimetic finite difference approximation of flows in fractured porous media, Mathematical Modelling and Numerical Analysis 50.3 EDP Sciences. (Year: 2016).*

Zhiming Chen and Thomas Y. Hou. 2003. A mixed multiscale finite element method for elliptic problems with oscillating coefficients. Math. Comput. 72, 242 (Apr. 1, 2003), 541-576. https://doi.org/10.1090/S0025-5718-02-01441-2 (Year: 2003).*

Xiang Rao et al, A Novel Projection-based Embedded Discrete Fracture Model (pEDFM) for Anisotropic Two-phase Flow Simulation Using Hybrid of Two-point Flux Approximation and Mimetic Finite Difference (TPFA-MFD) Methods, Journal of Computational Physics 499 (2024) 112736, pp. 39 (Year: 2024).*

* cited by examiner a EDFM b fracture projection c pEDFM a LGR b the novel pEDFM c EDFM d DFM a LGR b the novel pEDFM c EDFM d DFM a LGR b the novel pEDFM c EDFM d DFM a pEDFM using TPFA b the novel pEDFM c EDFM using MFD d DFM a pEDFM using TPFA    b the novel pEDFM c EDFM using MFD    d DFM a DFM, water saturation, 400 days c novel pEDFM, water saturation, 400 e DFM, water saturation, 600 days g novel pEDFM, water saturation, 600 days b DFM, pressure, 400 days d novel pEDFM, pressure, 400 days f DFM, pressure, 600 days h novel pEDFM, water saturation, 600 days a DFM, water saturation, 200 days b DFM, pressure, 200 days c novel pEDFM, water saturation, 200 days d novel pEDFM, pressure, 200 days e DFM, water saturation, 600 days f DFM, pressure, 600 days g novel pEDFM, water saturation, 600 days h novel pEDFM, water saturation, 600 days

PROJECTION-BASED EMBEDDED DISCRETE FRACTURE MODEL USING HYBRID OF TWO-POINT FLUX APPROXIMATION AND MIMETIC FINITE DIFFERENCE (TPFA-MFD) METHOD

TECHNICAL FIELD

The present invention relates to the field of reservoir numerical simulation technology, especially to a novel projection-based embedded discrete fracture model using hybrid of TPFA and MFD method.

BACKGROUND ART

In the past 20 years, the flow simulation of fractured formation has been a hot topic. Since the flow is usually dominated by fracture systems with complex geometries, a clear geometric description of the large-scale fracture network is required to ensure the simulation accuracy. So far, there are two widely used modeling methods. One is the discrete-fracture model (DFM) based on conforming grids. The model uses unstructured grids to match the fracture geometry, so that the fracture is located on the intersection surface between the matrix grids. Various DFMs have been developed using different numerical methods to discretize the governing equations. The DFMs constructed by different numerical methods have differences in accuracy, efficiency and adaptability of flow types.

However, as of now, an efficient and robust pEDFM framework applicable to general anisotropic two-phase flow scenarios has not yet been proposed. In practice, when using a generic pEDFM workflow that can be applied to a wide range of flow scenarios, the details of the inter-grid connections and the treatment of low-conductivity fractures in pEDFM will become much more complex than in the original pEDFM, which also brings challenges to the development of a pEDFM framework that can be applied to a wide range of anisotropic two-phase flow scenarios. In cases of non-K-orthogonal grids caused by anisotropy, the mixed finite element method (MFE) and the mimetic finite difference method (MFD) are allowed to directly use the pressure of the centroid of the grid surface to approximate the gird-surface flux it is more suitable for fractured reservoirs where there may be discontinuous distribution of physical quantities in space, and has been widely studied in recent years. Since MFE generally uses Raviart-Thomas (RTO) basis function, in the case of poor grid quality, the calculation accuracy will decrease, but it has been proved that MFD can achieve higher accuracy than MFE in the case of irregular grid distribution and poor grid quality. In 2016, Yan et al. constructed an MFD-based EDFM, demonstrating the effect of implementing MFD in EDFM to process full permeability tensors, but due to the inherent limitations of EDFM, the MFD-based EDFM will have significant errors in common actual flow scenarios such as blocking fractures or multiphase flow crossing fractures. In 2017, Zhang et al. developed a multi-scale MFD-based EDFM. Abushaikha and Terekhov in 2020, Zhang and Abushaikha in 2021, Li and Abushaikha in 2021 developed a fully implicit reservoir simulation framework based on MFD, applied and improved the framework to DFM and complex reservoir compositional models, respectively. However, compared with TPFA, MFD increases the density of the Jacobian matrix of the global equations, which increases the computational cost and reduces the computational efficiency. Therefore, in 2023, Dong et al. constructed a hybrid method of TPFA and MFD (TPFA-MFD) for fault block reservoirs, the hybrid method uses TPFA to estimate the numerical flux for K-orthogonal grids in the MFD framework, to reduce the density of Jacobian matrix and improving the computational efficiency. Previous pEDFMs requires extra manual treatments to achieve its theoretical computational advantage due to the lack of generic algorithm to construct fracture projection configurations and various inter-grid connections. Rao et al., (2023) proposed a first easy-programming generic pEDFM workflow to achieve its computational superior than DFM and EDFM in general cases without manual treatments, which laid the algorithm foundation for its commercialization. However, there is no method to combine the generic pEDFM workflow with TPFA-MFD.

SUMMARY

The purpose of the present invention is to provide a novel projection-based embedded discrete fracture model (DFM) using hybrid of two-point flux approximation and mimetic finite difference (TPFA-MFD) method, the novel pEDFM constructed by this model can deal with anisotropic reservoirs with full permeability tensor, TPFA-MFD (or MFD) is implemented in the pEDFM framework for the first time, which significantly extends the original generic pEDFM using TPFA to become a special case of the new pEDFM in the case of K-orthogonal grids, and significantly expands the application scope of the pEDFM framework.

To achieve the above purpose, the present invention provides a novel projection-based embedded discrete fracture model using hybrid of two-point flux approximation and mimetic finite difference (TPFA-MFD) method, which includes the following steps:

s1. constructing a treatment method suitable for low-conductivity fractures when using MFD;

s2. constructing a numerical flux calculation method for effective m-f and m-m connections, the hybrid TPFA-MFD method is used to estimate the numerical flux on each effective connection related to K-orthogonal and non-K-orthogonal grids by TPFA and MFD, respectively, and the spatial discretization of the continuity equation of the matrix grid and the fracture grid in the case of anisotropic full permeability tensor is realized;

s3. constructing global equations by combining the flux continuity conditions of effective m-f and m-m connections, the time discretization scheme of implicit backward Euler scheme is adopted, and the nonlinear solver based on Newton-Raphson method is used to calculate the distribution of pressure and water saturation.

Preferably, in step s1, let $f_1$ be a low-conductivity fracture, its permeability and fracture width are $k_f$ and $w_f$, respectively, the fracture grid in pEDFM adopts the transmissibility based on TPFA, and three types of connections are affected by low-conductivity fractures:

(1) for f-f connections, set to $f_i$ and $f_j$, a transmissibility of $f_i$-$f_j$ before being affected by f is:

$$T_{f_i f_j} = (T_{f_i}^{-1} + T_{f_j}^{-1})^{-1} \qquad (1)$$

wherein, $T_{f_i}$ is a transmissibility of fracture grid $f_i$, $T_{f_j}$ is a transmissibility of fracture grid $f_j$;

a transmissibility of ($f_i$, $f_j$) affected by $f_1$ is:

$$T_{f_i f_j} = \left(T_{f_i f_j}^{-1} + T_{f_1}^{-1}\right)^{-1} T_{f_1} = \frac{k_{f_1} A_{(f_i, f_j)}}{w_{f_1}/2} \qquad (2)$$

wherein, $k_{fl}$ is a permeability of fracture grid $f_l$, $w_{fl}$ is an opening of fracture grid $f_l$, $A_{(fi,\,fj)}$ is a flow area of $(f_i, f_j)$;

if other low-conductivity fractures that affect the f-f connections exist, using the Eq. (1) to continue updating;

(2) for m-f connections, set to $m_i$ and $f_j$, suppose that a transmissibility of $f_j$ in $m_i$-$f_j$ connections not affected by $f_l$ is based on the $T_{fj}$, the effect of $f_l$ is applied to $f_j$, which is equivalent to the series connection of low-conductivity fractures $f_l$ and $f_j$, that is, the transmissibility of $f_j$ is updated as:

$$T_{fj}=(T_{fj}^{-1}+T_{fl}^{-1}) \qquad (3)$$

if other low-conductivity fractures that affect the m-f connections exist, using Eq. (3) to continue updating $T_{fj}$;

(3) for m-m connections, set to $m_i$ and $m_j$, the $m_i$-$m_j$ connections are split into $m_i$-$f_l$ connections and $m_j$-$f_l$ connections, the flow area of $m_i$-$f_j$ connections and $m_j$-$f_l$ connections are the flow area $A_{(mi,\,mj)}$ of $(m_i, m_j)$, wherein a transmissibility of $f_l$ is:

$$T_{fl} = \frac{k_{fl}A_{(m_i,m_j)}}{w_{fl}/2} \qquad (4)$$

wherein, $A_{(mi,\,mj)}$ is a flow area of $(m_i, m_j)$;

if other low-conductivity fractures $f_k$ that affect $(m_i, m_j)$ exist, a transmissibility of $f_l$ is updated by using a transmissibility of $f_k$ in Eq. (3):

$$T_{fl} = \left(T_{fl}^{-1} + T_{fk}^{-1}\right)^{-1} T_{fk} = \frac{k_{fk}A_{(m_i,m_j)}}{w_{fk}/2} \qquad (5)$$

Preferably, a treatment of low-conductivity fractures will add new connections in $Cont_1^{eff}$, and an updated $Cont_1^{eff}$ is recorded as $Cont_2^{eff}$.

$$Cont_1^{eff}=Cont_1-Cont_1^0 \qquad (6)$$

wherein, $Cont_1$ is a inter-grid connection set obtained by ignoring the low-conductivity fractures when using the generic pEDFM to treat the low-conductivity fractures with the non-projection transmissibility multiplier method; $Cont_1^0$ is a set of connections with a flow area of 0 in $Cont_1$; and $Cont_1^{eff}$ is the efficient set in $Cont_1$.

Preferably, in step S2, let a number set of the matrix grid which is adjacent to the matrix grid $m_i$ be $neigh_{m_i}$, then the set of effective connections on each $m_i$-side face of $m_i$ is:

$$Cont_2^{eff}(m_i) = \underset{j \in neigh_{m_i}}{U} Cont_2^{eff}(1_{ij}^{m_i}), \qquad 55$$

according to Eq. (7):

$$\overline{p}_{1_{ij}}^{m_i} = \frac{\sum\limits_{\xi \in Cont_2^{eff}(1_{ij}^{m_i})} p_\xi A_\xi}{\sum\limits_{\xi \in Cont_2^{eff}(1_{ij}^{m_i})} A_\xi} \qquad (7)$$

wherein $\overline{p}_{1_{ij}}^{m_i}$ is an average pressure of the side near $m_i$ of intersecting face of $m_i$ and $m_j$, $p_\zeta$ is a pressure degree of freedom added by the $\zeta$ connection in $Cont_2^{eff}(1_{ij}^{m_i})$, $p_\zeta$ is a flow area of the $\zeta$ connection in $Cont_2^{eff}(1_{ij}^{m_i})$;

the conversion formula between the average pressure of $m_i$-side of $m_i$-side faces and the value of the pressure degree of freedom added by each connection in $Cont_2^{eff}(m_i)$ is obtained:

$$\overline{p}_{m_i}=Ap_{m_i} \qquad (8)$$

wherein $\overline{p}_{m_i}$ is a column vector composed of $\overline{p}_{ij}^{m_i}$, ($j \in neigh_{m_i}$), $p_{m_i}$ is a column vector composed of $p_j(j \in Cont_2^{eff}(m_i))$, each j-line of A represents the area weight when using Eq. (7) to calculate the average pressure on the j-th $m_i$-side face of $m_i$.

Preferably, in step S2, $A^T$ is a distribution matrix of the numerical flux on each surface of $m_i$ to the flux on each connection in $Cont_2^{eff}(m_i)$.

$$flux_i=A^T\overline{flux}_i \qquad (9)$$

firstly, it is judged whether the matrix grid $m_i$ is K orthogonal, if yes, then the transmissibility matrix $T^{m_i}$ in $m_i$ is calculated by using the Eq. (10) based on TPFA;

$$T_{\beta,\gamma}^{m_i} = \begin{cases} T_{i\beta} & \text{if } \beta = \\ 0 & \text{if } \beta \neq \gamma \end{cases} T_{i\beta} = |\partial \Omega_{i\beta}| \frac{K_i r_{i\beta}}{|r_{i\beta}|^2} \cdot n_{i\beta} \qquad (10)$$

wherein $T_{\beta,\gamma}^{m_i}$ represents $\beta$ row and $\eta$ column of matrix $T^{m_i}$, $r_{i\beta}$ is a vector from grid i-center to grid $\partial\Omega_{i\beta}$-center, $n_{i\beta}$ is the unit outward normal vector of $\partial\Omega_{i\beta}$, $p_{i\beta}$ is the pressure value at the center of $\partial\Omega_{i\beta}$;

if not, then the transmissibility matrix $T^{m_i}$ in $m_i$ is calculated by using Eq. (11) based on MFD;

$$T_{i1} = \frac{1}{|\Omega_i|} N_i K_i N_i^T T_{i2} = \frac{6}{d} tr(K_i) A_i (I_i - Q_i Q_i^T) A_i \qquad (11)$$

wherein, $\Omega_i$ is a control region of matrix grid $m_i$, $|\Omega_i|$ is a volume of matrix grid T $m_i$, $K_i$ is a permeability tensor of matrix grid $m_i$, $X_i=(x_{i1}-x_i, L, x_{i\beta}-x_i, L, x_{in_i}-x_i)^T$, $x_i$ is a vector of the center of grid i, $x_{i\beta}$ is a vector of $\partial\Omega_{i\beta}$ center, $N_i=(|\partial\Omega_{i1}|n_{i1}, L, |\partial\Omega_{i\beta}, n_{i\beta}, L, |\partial\Omega_{in_i}|n_{in_i})^T$, d is a grid dimension, $A_i=diag(|\partial\Omega_{i1}, L, |\partial\Omega_{i\beta}, L, |\partial\Omega_{in_i})$, $Q_i=orth(A_i X_i)$.

then, the average pressure is used to participate in the calculation of the numerical flux on each surface of the matrix grid, and it is obtained that:

$$\overline{flux}_i=T^{m_i}p_{m_i}=T^{m_i}Ap_{m_i}=T^{m_i}A(p_{m_i}I=p_{m_i}) \qquad (12)$$

wherein, $flux_i$ is a column vector composed of numerical flux on each surface of the matrix grid, each j-line of A represents the area weight when the average pressure of the j-th surface of $m_i$ side calculated by Eq. (28), meanwhile, $A^T$ is the distribution matrix of the numerical flux on each surface of $m_i$ to the flux on each connection in Contz (ma) and I is a column vector wherein one of elements is 1 and the length is the effective connection number of the matrix grid;

furthermore, by combining Eq. (9) and Eq. (12), get:

$$flux_i=A^T T^{m_i}A(p_{m_i}I-p_{m_i}) \qquad (13)$$

for the matrix grid $m_i$, the actual transmissibility matrix is:

$$\widetilde{T}^{m_i} = A^T T^{m_i} A \qquad (14).$$

Preferably, in step S3, the flux on each connection related to $m_i$, is calculated by using the transmissibility matrix given in Eq. (14), and the discrete scheme of the continuity equation in $m_i$ is obtained.

$$\sum_{\beta \in Cont_1^{eff}(m_i)} \frac{k_{r\alpha,i\beta}}{\mu_{\alpha,i\beta} B_{\alpha,i\beta}} \sum_{\gamma \in Cont_1^{eff}(m_i)} \tilde{T}^{m_i}_{\beta,\gamma}\left(p_{m_i}^{t+\Delta t} - p_\gamma^{t+\Delta t}\right) + Q_a =$$

$$\frac{|\Omega_i|}{\Delta t}\left[\left(\frac{\phi S_a}{B_a}\right)^{t+\Delta t}_{m_i} - \left(\frac{\phi S_a}{B_a}\right)^{t}_{m_i}\right]$$

wherein, $k_{r\alpha,ij}$ is a relative permeability of the α-th phase between the matrix grid $m_i$ and the matrix grid $m_j$ according to the single-point upwind scheme, $\mu_{\alpha,ij}$ ij and $B_{\alpha,ij}$ are the viscosity and volume coefficient of the ith phase calculated by the arithmetic average scheme between the matrix grid $m_i$ and the matrix grid $m_j$, respectively, subscript β refers to the serial number of the intersection surface of matrix grid $m_i$ and matrix grid $m_j$ in all surfaces of matrix grid $m_i$, $F_{i\beta}$ is the outward normal flux of matrix grid $m_i$ on the β-th plane, $\tilde{T}^{m_i}_{\beta,\gamma}$ is the β-th row and γ-th column of the transmissibility matrix $T^{m_i}$, and $p_{i\gamma}$ is the surface center pressure of the γ-th plane of the matrix grid $m_i$, $p_i$ is the body center pressure of matrix grid $p_i$, $\Delta t$ is the time stepping, $\phi_i$, $S_{\alpha,i}$ and $B_{\alpha,i}$ are the porosity of matrix grid $m_i$, the saturation of a phase and the volume coefficient of a phase, respectively, and the superscripts $t+\Delta t$ and $t$ represent the time;

For a fracture grid $f_j$, a transmissibility is in a simple scheme based on TPFA, the effective connection $Cont_2^{eff}(f_j)$ related to $f_j$ includes f-f connection $Cont_{f_j}^{f-f}$ and m-f connection $Cont_{f_j}^{m-f}$, the set of fracture grids adjacent to $f_j$ reflected from $Cont_{f_j}^{f-f}$ is denoted as $neigh_{f_j}$, then the discrete scheme of the continuity equation in $f_j$ is:

$$\sum_{\beta \in Cont_{f_j}^{m-f}}, \frac{k_{r\alpha,i\beta}}{\mu_{\alpha,i\beta} B_{\alpha,i\beta}} \sum_{\gamma \in Cont_{f_j}^{m-f}} \tilde{T}^{m_i}_{\beta,\gamma}\left(p_{f_j}^{t+\Delta t} - p_\gamma^{t+\Delta t}\right) +$$

$$\sum_{\beta \in neigh_{f_j}} \frac{k_{r\alpha,i\beta}}{\mu_{\alpha,i\beta} B_{\alpha,i\beta}} T_{f_j\beta}\left(p_{f_j}^{t+\Delta t} - p_\beta^{t+\Delta t}\right) + Q_a = \tag{16}$$

$$\frac{|\Omega_{f_j}|}{\Delta t}\left[\left(\frac{\phi S_a}{B_a}\right)^{t+\Delta t}_{f_j} - \left(\frac{\phi S_a}{B_a}\right)^{t}_{f_j}\right]$$

Preferably, when each matrix grid $\tilde{T}^{m_i}$ is obtained, the transmissibility of all effective m-m-connections and m-f-connections matrix grids is known, while a transmissibility of fracture grids in m-f connections still adopts a simple scheme based on TPFA.

for m-m connections, suppose $m_i$ and $m_k$, then:

$$\text{flux}_{m_i \to m_k} = \tilde{T}^{m_i}_{m_k}(p_{m_i}I - p_{m_i})\text{flux}_{m_k \to m_i} = \tilde{T}^{m_i}_{m_k}(p_{m_i}I - p_{m_i}) \tag{17}$$

the corresponding flux continuity conditions are:

$$\tilde{T}^{m_i}_{m_k}(p_{m_i}I - p_{m_i}) + \tilde{T}^{m_i}_{m_k}(p_{m_i}I - p_{m_i}) = 0 \tag{18}$$

For m-f connections, suppose $m_i$ and $f_j$, then:

$$\text{flux}_{m_i \to f_j} = \tilde{T}^{m_i}_{f_j}(p_{m_i}I - p_{m_i})\text{flux}_{f_j \to m_i} = T_{f_j}(p_{f_j} - p_{(m_i,f_j)}) \tag{19}$$

The corresponding flux continuity conditions are:

$$\tilde{T}^{m_i}_{f_j}(p_{m_i}I - p_{m_i}) + T_{f_j}(p_{f_j} - p_{(m_i,f_j)}) \tag{20}$$

For f-f connections, the transmissibility formula in generic pEDFM without defining additional pressure degrees of freedom is adopted.

Therefore, the present invention adopts a novel projection embedded DFM using the hybrid method of TPFA and MFD, and its technical effects are as follows:

(1) The concepts of effective connection and average pressure on the matrix grid surface are defined, and the distribution of additional pressure degrees of freedom is clarified. A low-conductivity fracture treatment method suitable for MFD is proposed. The numerical flux calculation formula of each effective connection is derived, and the flux conservation conditions of each effective connection are given, and the implementation of MFD or TPFA-MFD in pEDFM is realized.

(2) The novel pEDFM of the present invention essentially includes pEDFM using MFD and pEDFM using TPFA, the present invention demonstrates through theory and implementation examples that pEDFM using TPFA-MFD can achieve almost the same calculation accuracy as pEDFM using MFD, but pEDFM using TPFA-MFD can use TPFA to estimate the numerical flux of K-orthogonal grids, not all using MFD, which improves the structure of the Jacobian matrix when solving global equations and improves the calculation efficiency.

(3) The novel pEDFM can achieve the same calculation accuracy as DFM, and can avoid the difficulty of generating matching grids by DFM and the additional computational cost caused by the over-density of local grids caused by the narrow area between fractures, and has good convergence.

(4) Compared with several commonly used numerical simulation frameworks for fractured reservoirs, the new pEDFM has better comprehensive performance and has very significant field application potential.

The following is a further detailed description of the technical scheme of the invention through the drawings and embodiments.

DETAILED DESCRIPTION OF THE EMBODIMENTS

Figure 1:
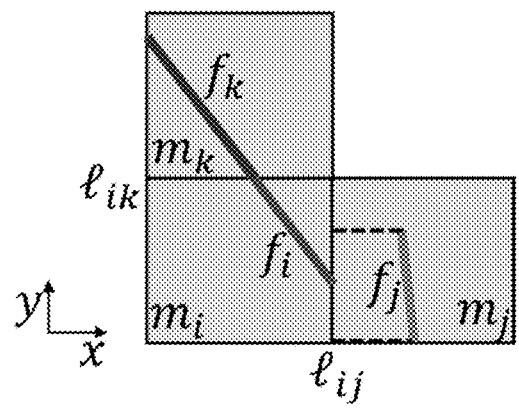
FIG. 1 is a model diagram.
Figure 1:
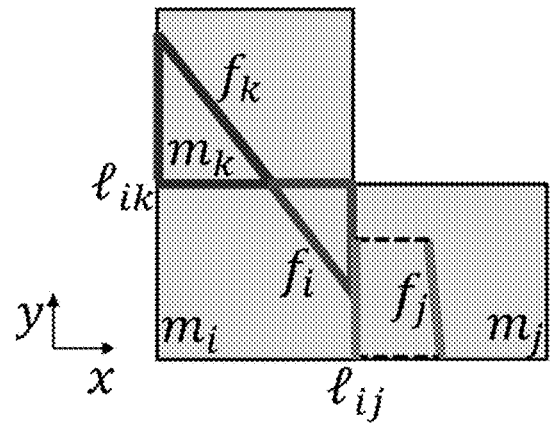
Figure 1:
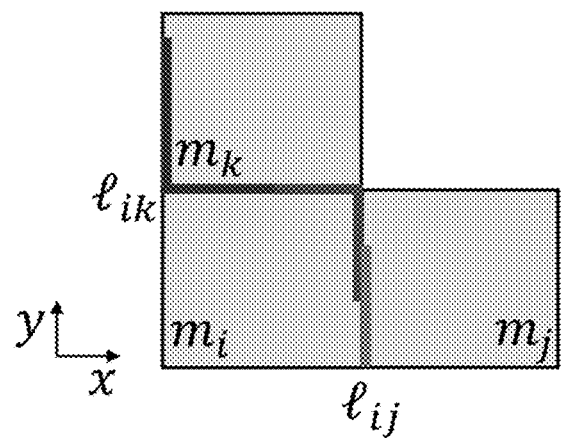

In order to illustrate the technical effect of the invention, the existing technology and the improvement of the invention are explained first.

1.1 Reservoir Two-Phase Flow Control Equation

Continuity equation of each phase:

$$-\nabla \cdot v_a + q_{a,sc} = \frac{\partial}{\partial t}\left(\frac{\phi S_a}{B_a}\right), \quad a = o(\text{oil}) \text{ or } w(\text{water}) \tag{1}$$

Wherein $v_\alpha$ is the flow velocity, $q_{\alpha,sc}$ is the source and sink term of phase a under the ground condition, $S_\alpha$ and $B_\alpha$ are the saturation and volume coefficient of phase a, respectively, t is time, $\phi$ is porosity.

The flow velocity satisfies the Darcy's law:

$$v_a = -\lambda_a K \nabla p_a \lambda_a = \frac{k_{ra}}{B_a \mu_a} \tag{2}$$

Wherein K is the permeability tensor, $\lambda_\alpha$ is the mobility of phase $\alpha$, $p_\alpha$, $k_{r\alpha}$, $\mu_\alpha$ and $B_\alpha$ are the pressure, relative permeability, viscosity and volume coefficient of phase $\alpha$, respectively.

Taking Eq. (2) into Eq. (1), get:

$$\nabla \cdot \left(\frac{k_a}{\mu_a B_a} K \nabla p_a\right) + q_{a,sc} = \frac{\partial}{\partial t}\left(\frac{\phi S_a}{B_a}\right) \tag{3}$$

1.2 Discretization of Control Equations

Integrating both sides of Eq. (3) in grid i control volume $\Omega_i$ and time period [t, t+Vt], get:

$$\int_t^{t+\Delta t}\int_{\Omega_i} \nabla \cdot \left(\frac{k_a}{\mu_a B_a} K \nabla p_a\right) d\Omega dt + Q_a = \int_{\Omega_i}\left[\left(\frac{\phi S_a}{B_a}\right)^{t+\Delta t} - \left(\frac{\phi S_a}{B_a}\right)^t\right] d\Omega \tag{4}$$

wherein $\int_{\Omega_i} q_{\alpha,sc} dA = Q_{\alpha,sc}$

The rectangular formula is used to estimate the time integral on the left side and the space integral on the right side of Eq. (4), get:

$$\int_{\Omega_i} \nabla \cdot \left(\frac{k_a}{\mu_a B_a} K \nabla p_a\right) d\Omega + Q_a = \frac{|\Omega_i|}{\Delta t}\left[\left(\frac{\phi S_a}{B_a}\right)_i^{t+\Delta t} - \left(\frac{\phi S_a}{B_a}\right)_i^t\right] \tag{5}$$

By using the divergence theorem, the first term on the left side of (5) can be rewritten as follows:

$$\int_{\Omega_i} \nabla \cdot \left(\frac{k_a}{\mu_a B_a} K \nabla p\right) d\Omega = \sum_{\beta=1}^{n_i} \int_{\partial\Omega_{i\beta}} \frac{k_{ra}}{\mu_a B_a} K \nabla p \cdot n dA = -\sum_{\beta=1}^{n_i} F_{i\beta} \tag{6}$$

wherein, subscript $i\beta$ represents the $\beta$th edge of grid i (if it is three-dimensional, it is the $\beta$th surface of grid i), and $F_{i\beta}$ is the outward normal flux on $\partial\Omega_{i\beta}$.

For two adjacent grids, it may be written as grid i and grid j, and the intersection of grid i and grid j is written as $e_{ij}$, $\exists \beta$, $\eta$ s.t., $\partial\Omega_{i\beta} = \partial\Omega_{j\eta} = e_{ij}$. In Eq. (5), the single-point upstream weight scheme in (6) is generally used in $k_{r\alpha}$, and $\mu_\alpha$ and $B_\alpha$ generally adopt the arithmetic average scheme in Eq. (7).

$$k_{ra,ij} = \begin{cases} k_{ra}(S_{a,j}) & \text{if } F_{i\beta} < 0 \\ k_{ra}(S_{a,i}) & \text{if } F_{i\beta} \geq 0 \end{cases} \tag{7}$$

$$\mu_{a,ij} = \frac{\mu_{a,i} + \mu_{a,j}}{2} \quad B_{a,ij} = \frac{B_{a,i} + B_{a,j}}{2} \tag{8}$$

2.1 Two-Point Flux Approximation (TPFA)

In the finite volume method with two-point flux approximation, the numerical flux of grid i on $e_{ij}$ is calculated as:

$$F_{i\beta} = \frac{k_{ra,ij}}{\mu_{a,ij} B_{a,ij}} T_{i\beta}(p_i - p_{i\beta}) \tag{9}$$

wherein $$T_{i\beta} = |\partial\Omega_{i\beta}| \frac{K_i r_{i\beta}}{|r_{i\beta}|^2} \cdot n_{i\beta},$$

$r_{i\beta}$ is a vector from grid i-center to grid, $\partial\Omega_{i\beta}$-center, $n_{i\beta}$ is the unit outward normal vector of $\partial\Omega_{i\beta}$, and $p_{i\beta}$ is the pressure value at the center of $\partial\Omega_{i\beta}$.

According to Eq. (8), the expression of the outward normal flux of $\partial\Omega_{i\beta}$ expressed by the transmissibility matrix $T^i$ can be obtained:

$$F_{i\beta} = \frac{k_{ra,ij}}{\mu_{a,ij} B_{a,ij}} \sum_{\gamma=1}^{n_i} T^i_{\beta,\gamma}(p_i - p_{i\gamma}) T^i_{\beta,\gamma} = \begin{cases} T_{i\beta} & \text{if } \beta = \gamma \\ 0 & \text{if } \beta \neq \gamma \end{cases} \tag{10}$$

wherein, T denotes the $\beta$ row and $\eta$ columns of matrix $T^i$.

2.2 Simulating Finite Difference

Generally, TPFA can only achieve high-precision flux approximation in K-orthogonal grids, and K-orthogonal meets that:

$$K_i r_{i\beta} \times n_{i\beta} = 0 \tag{11}$$

MFD can be applied to both K-orthogonal and non-K-orthogonal grids, the transmissibility matrix $T^i$ given by MFD is generally more denser than that given by TPFA, which is different from the diagonal transmissibility matrix in (10).

In MFD, the calculation expression of $T^i$ is:

$$T^i = T_{i1} + T_{i2} T_{i1} = \frac{1}{|\Omega_i|} N_i K_i N_i^T T_{i2} = \frac{6}{d} tr(K_i) A_i (I_i - Q_i Q_i^T) A_i \tag{12}$$

Wherein $X_i = (x_{i1} - x_i, L, x_{i\beta} - x_i, L, x_{in_i} - x_i)^T$ $x_i$ is the vector of the center of grid i, $x_{i\beta}$ is the position vector of $\partial\Omega_{i\beta}$ center, $N_i = (|\partial\Omega_{i1}|n_{i1}, L, |\partial\Omega_{i\beta}|n_{i\beta}, L, |\partial\Omega_{in_i}|n_{in_i})^T$, d is the grid dimension, $A_i = \text{diag}(|\partial\Omega_{i1}|, L, |\partial\Omega_{i\beta}|, L, |\partial\Omega_{in_i}|))$
$Q_i = \text{orth}(A_i X_i)$

2.3 Flux Continuity Conditions

It can be seen from 2.1 and 2.2 that grid i and grid j have an outward normal flux $F_{i\beta}$ and $F_{j\eta}$ on the intersection $e_{ij}$, respectively, the flux continuity condition should be satisfied, that is, the algebraic sum of $F_{i\beta}$ and $F_{j\eta}$ should be equal to 0.

$$F_{i\beta} + F_{j\eta} = \sum_{\gamma=1}^{n_i} T_{\beta,\gamma}^i \left( p_i^{t+\Delta t} - p_{i\gamma}^{t+\Delta t} \right) + \sum_{\xi=1}^{n_j} T_{\eta,\xi}^j \left( p_j^{t+\Delta t} - p_{j\xi}^{t+\Delta t} \right) = 0 \quad (13)$$

In fact, when using TPFA, $p_{i\beta}$ can be eliminated according to Eqs. (9) and (13), the numerical flux based on TPFA can be calculated as Eq. (14), that is, the transmissibility formula based on the harmonic average scheme in the common TPFA, in essence, there is no need to add additional pressure degrees of freedom between grid i and grid j.

$$F_{ij} = \frac{k_{ra,ij}}{\mu_{a,ij} B_{a,ij}} T_{ij} (p_i - p_j) T_{ij} = \left( T_{i\beta}^{-1} + T_{j\gamma}^{-1} \right)^{-1} \quad (14)$$

It can be considered that TPFA is a form of MFD in the case of K-orthogonality without adding additional pressure degrees of freedom to the connection between grids, however, in the case of non-K orthogonal, the definition of additional pressure degree of freedom is difficult to avoid. With the additional pressure degree of freedom, there will be a flux continuity condition, so that the global equations can still be solved in a closed form.

2.4 Hybrid of TPFA and MFD

TPFA can be used to estimate the numerical flux on K-orthogonal grids, for example, it has a regular grid of isotropic permeability, while MFD-based flux approximation is used only in the remaining grids that do not satisfy K-orthogonality. According to Eq. (5), Eq. (6), Eq. (10) and Eq. (12), the discrete scheme of Eq. (3) can be obtained as follows:

$$\frac{k_{ra,ij}}{\mu_{a,ij} B_{a,ij}} \sum_{\beta=1}^{n_i} \sum_{\gamma=1}^{n_i} \left[ T_{\beta,\gamma}^i \left( p_{i\gamma}^{t+\Delta t} - p_i^{t+\Delta t} \right) \right] + Q_a = \frac{|\Omega_i|}{\Delta t} \left[ \left( \frac{\phi S_a}{B_a} \right)^{t+\Delta t} - \left( \frac{\phi S_a}{B_a} \right)^t \right] \quad (15)$$

The Eq. (13) and Eq. (15) constitute the global equations, and the Newton-Raphson (NR) iteration method is used to solve the equations to obtain the pressure, saturation distribution and production dynamic data.

(3) EDFM and Generic pEDFM Workflow

3.1 EDFM

EDFM mainly includes three types of connections, namely, the connections between two adjacent matrix grids, the connections between the matrix grid and the inter-grid fracture it contains, and the connection between inter-grid fractures. In order to facilitate the description, the connections between two grids are denoted by $(\cdot, \cdot)$. As shown in FIG. 1(a), the first type of connection includes $(m_i, m_j)$ and $(m_i, m_k)$, the second type of connection includes $(m_i, f_i)$, $(m_j, f_j)$ and $(m_k, f_k)$, and the third type of connection includes $(f_i, f_k)$.

For the first type of connection, taking $(m_i, m_j)$ as an example, when TPFA is used, similar to Eq. (14), it can be calculated that the transmissibility of $(m_i, m_j)$ is half of the harmonic mean of the transmissibility of $m_i$ and the transmissibility of $m_j$:

$$T_{m_i, m_j} = \left( T_{m_i}'^{-1} + T_{m_j}'^{-1} \right)^{-1} T_{m_i}' = \frac{k_{m_i} A(1_{ij})}{d_{m_i}} T_{m_j}' = \frac{k_{m_j} A(1_{ij})}{d_{m_j}} \quad (16)$$

wherein $A(\cdot)$ denotes the area operator and $1_{ij}$ is the interface of $m_i$ and $m_j$.

Similarly, for the second type of connection, $$T_{f_i, m_i} = \left( T_{f_i}^{-1} + T_{m_i}^{-1} \right)^{-1} T_{f_i} = \frac{k_{f_i} A_{f_i}}{w_{f_i}/2} T_{m_i} = \frac{2k_{m_i} A_{f_i}}{\langle d_{f_i m_i} \rangle} \langle d_{f_i m_i} \rangle = \frac{\int_{\Omega_{m_i}} |x \cdot n| dV}{V_{m_i}} \quad (17)$$

For the third type of connection, it is generally necessary to subdivide it into two cases. The first case is the connection between inter-grid fractures on the same fracture surface. For example $(f_i, f_k)$, the transmissibility is calculated as:

$$T_{f_i f_k} = \left( T_{f_i}^{-1} + T_{f_k}^{-1} \right)^{-1}, T_{f_i} = \frac{k_{f_i} w_{f_i} h_{f_i}}{d_{f_i}}, T_{f_k} = \frac{k_{f_k} w_{f_k} h_{f_k}}{d_{f_k}} \quad (18)$$

The second case is the connection between multiple fracture grids that may exist in the same matrix grid, which is generally calculated by star-delta transformation.

3.2 Generic pEDFM Process pEDFM is a model between EDFM and DFM, as shown in FIG. 1(b), taking $f_i$ as an example, pEDFM projects $f_i$ along the x and y directions to $1_{ij}$ and $1_{ik}$, respectively, at this time, pEDFM transforms the original model in FIG. 1(a) into the model in FIG. 1(c). At this point, compared with EDFM, $f_i$ needs to be connected to $m_j$ and $m_k$, the corresponding flow area is the projection area of $f_i$, meanwhile, since the connection of $(m_j, f_i)$ and $(m_k, f_i)$ occupies the area of $1_{ij}$ and $1_{ik}$, the flow area of the original $(m_j, f_j)$ and $(m_k, f_i)$ is weakened. Meanwhile, because $f_i$ and $f_j$ are projected onto $1_{ij}$, there is also a connection between $f_i$ and $f_j$.

The core idea of the generic pEDFM workflow is to use the micro-translation projection method to deal with high-conductivity fracture units, and to use the non-projection transmissibility multiplier method to model low-conductivity fractures.

When the matrix permeability is isotropic, the permeability of the m-f connections added to the pEDFM in FIG. 1 is:

$$T_{f_i m_i} = \left( T_{f_i}^{-1} + T_{m_j}^{-1} \right)^{-1}, T_{f_i} = \frac{k_{f_i} A\left( f_{j,1_{ij}}^p \right)}{w_{f_j}/2}, T_{m_j} = \frac{k_{m_j} A\left( f_{j,1_{ij}}^p \right)}{d_{m_j,1_{ij}}} \quad (19)$$

$$T_{f_j m_i} = \left( T_{f_j}^{-1} + T_{m_i}^{-1} \right)^{-1}, T_{f_j} = \frac{k_{f_j} A\left( f_{j,1_{ij}}^p \right)}{w_{f_j}/2}, T_{m_j} = \frac{k_{m_j} A\left( f_{j,1_{ij}}^p \right)}{d_{m_j,1_{ij}}} \quad (20)$$

wherein $f_{i,1_{ij}}^p$ and $f_{j,1_{ij}}^p$ are the projections of $f_i$ and $f_j$ on $1_{ij}$.

The transmissibility of the original m-m connections is reduced to:

$$T_{m_i,m_j} = \left(T'^{-1}_{m_i} + T'^{-1}_{m_j}\right)^{-1}, T'_{m_i} = \frac{k_{m_i}\left(A(1_{ij}) - A\left(f^p_{i,1_{ij}}\right)\right)}{d_{m_i,1_{ij}}},$$

$$T'_{m_j} = \frac{k_{m_j}\left(A(1_{ij}) - A\left(f^p_{j,1_{ij}}\right)\right)}{d_{m_j,1_{ij}}}$$

$$T_{m_i,m_k} = \left(T'^{-1}_{m_i} + T'^{-1}_{m_k}\right)^{-1}, T'_{m_i} = \frac{k_{m_i}\left(A(1_{ij}) - A\left(f^p_{i,1_{ik}}\right)\right)}{d_{m_i,1_{ik}}},$$

$$T'_{m_k} = \frac{k_{m_k}\left(A(1_{ij}) - A\left(f^p_{j,1_{ik}}\right)\right)}{d_{m_k,1_{ik}}}$$

By halving the transmissibility of the matrix grid, the transmissibility of the original m-f connections is weakened. Taking $(m_i, f_i)$ as an example, the transmissibility is calculated as:

$$T_{f_i,m_i} = \left(T^{-1}_{f_i} + T^{-1}_{m_i}\right)^{-1}, T_{f_i} = \frac{k_{f_i}A_{f_i}}{w_{f_i}/2}, \quad (23)$$

$$T_{m_i} = \frac{k_{m_i}A_{f_i}}{\langle d_{f_i m_i}\rangle}, \langle d_{f_i m_i}\rangle = \frac{\int_{\Omega_{m_i}} |x \cdot n| dV}{V_{m_i}}$$

Added transmissibility $(f_i, f_i)$:

$$T_{f_i f_j} = \left(T^{-1}_{f_i} + T^{-1}_{f_j}\right)^{-1}, T_{f_i} = \frac{k_{f_i} A^p_{f_i}}{w_{f_i}/2}, T_{f_j} = \frac{k_{f_j} A^p_{f_j}}{w_{f_j}/2} \quad (24)$$

Then, the generic pEDFM gives a non-projection method to model low-conductivity fractures, as shown below: the updated transmissibility of the connection is:

$$T'_{ij} = \left(T^{-1}_{ij} + T^{-1}_{f}\right)^{-1}, T_f = \frac{k_f A_{ij}}{w_f} \quad (25)$$

Wherein $T_{ij}'$ and $T_i$ are the updated and original transmissibility of the connection; connected updated and original transmissive semi-transmissibility of low-conductivity fractures; $k_f$ and $w_f$ are the permeability and pore size of low-conductivity fractures, respectively; $A_{ij}$ is the flow cross-sectional area corresponding to the connection; if $k_f=0$, the updated transmissibility in Eq. (25) will become zero, so the flow barrier can block the flow. It should be noted that if multiple low-conductivity fractures intersect with the same connection, the transportability of the connection will be updated multiple times by using Eq. (25).

4.1 the Basic Idea of the Present Invention

Figure 2:
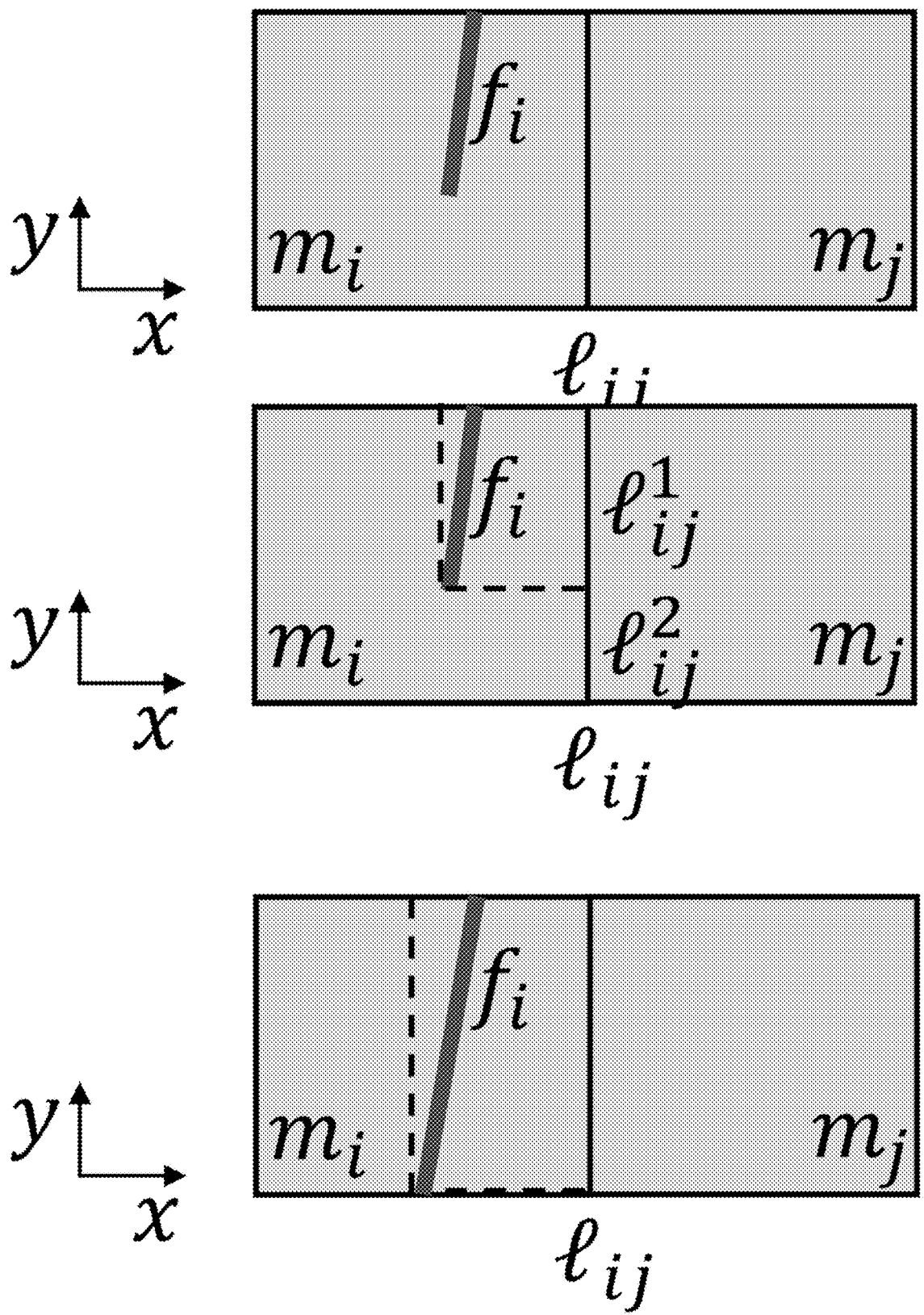
FIG. 2 is a sketch of some cases.

The connection between the matrix and the fracture in EDFM is very simple, and only the connection between the matrix grid and the fracture grid contained in the matrix grid is established, it is essentially a local dual-medium model, which makes the m-f connections in EDFM not affect the original m-m connections between adjacent matrix intergrid. Therefore, when using MFD to deal with the full tensor permeability of the matrix grid in EDFM, it is only necessary to use the transfer matrix based on dense MFD in the structured background matrix grid to replace the diagonal transmissibility matrix obtained by TPFA in the original matrix grid. Of course, it can be further considered that the permeability of the matrix grid is the influence of the full tensor case on the m-f transmissibility in EDFM. In general, due to the simplicity of the grid connection structure in EDFM, it is a simple task to construct an EDFM based on MFD. However, pEDFM, which performs better than EDFM, has a much more complex connection relationship than EDFM. The most important point is that the m-f connections in pEDFM will weaken the original m-m connections, or even directly cover the original m-m connections and make them disappear, which makes the above strategies that can work in EDFM not directly work in pEDFM. The specific explanation is as follows:

As shown in FIG. 2(a), m, contains a fracture unit $f_i$, $m_i$ and $m_j$ are adjacent, in EDFM, the pressure is continuous on the intersection $I_{ij}$ of $m_i$ and $m_j$, this facilitates the application of the aforementioned MFD theory to construct flux continuity conditions at $I_{ij}$. However, because the essence of pEDFM is to project fractures onto the interface of matrix grids, the original embedded discrete scheme is transformed into an approximate DFM to deal with. In pEDFM, as shown in FIG. 2(b), the $f_i$ in the matrix grid $m_i$ needs to be projected on $I_{ij}$, but not fully covered $I_{ij}$, the area covered by the fracture projection is denoted as $I_{ij}^1$, the remaining region on the $I_{ij}$ plane is $I_{ij}^2$, the pressure is continuous only on the $m_i$-side and $m_j$-side of $I_{ij}^2$, the pressure on the $m_i$-side and $m_j$-side of $I_{ij}^1$ may be discontinuous, for example, if the permeability of the fracture is only slightly higher than that of the matrix grid, at this time, fluid is displaced to $m_j$, from $m_i$, and there is a pressure difference that cannot be ignored on both sides of $I_{ij}^1$. Therefore, the pressure values on different connections may be distributed on the intersection of the matrix grids that undertake the fracture projection in pEDFM, and it is necessary to distinguish the possible discontinuous pressures on the left and right sides on the intersection of the matrix grids.

The above analysis gives the following important inspirations:

i) The concept of effective connectivity needs to be introduced. As shown in FIG. 2(c), the projection of fracture $f_j$ on $I_{ij}$ will completely cover $I_{ij}$, at this time, there will be no need to define additional pressure degrees of freedom between $m_i$ and $m_j$. If the additional definition is given, the global equations will not have the flow continuity equation related to the pressure degree of freedom, so that the global equations can not be solved in closed form. Therefore, it is necessary to introduce the definition of effective connection, that is, the connection whose actual flow area is not 0. Only such a connection can define an additional pressure degree of freedom.

ii) The pressure degree of freedom is only added to the effective connection related to the matrix grid. Since TPFA can still be used to calculate the numerical flux in the fracture. Therefore, the transmissibility information of the f-f connections in the generic pEDFM workflow can be kept unchanged without the need to define additional pressure degrees of freedom on the original f-f connections to carry out MFD. In other words, by obtaining effective m-m connections and m-f connections, an additional pressure degree of freedom is defined only on these effective connections related to the matrix grid.

iii) The distribution of the pressure degree of freedom on which side of the matrix grid surface should be solved. As mentioned above, the essence of pEDFM is to project the fracture onto the interface of the matrix grid, and transform the original embedded discrete scheme into an approximate DFM to deal with. Therefore, the added pressure degrees of freedom can be considered to be distributed on the matrix grid surface. Meanwhile, because the pressure on both sides of the fracture projection area on the matrix grid surface may no longer be continuous, the pressure degrees of freedom added by different connections need to be distinguished to which side of the matrix grid surface is located. As shown in FIG. 2(b), the projection area of fracture $f_j$ on $I_{ij}$ is not 0, therefore, there are two effective connections of $(m_i, f_i)$ and $(m_j, f_i)$. Then the pressure degree of freedom added for $(m_i, f_i)$ is actually located on the side of $I_{ij}$ near $m_i$ side, the pressure degree of freedom added for $(m_j, f_i)$ is actually located on the side of $I_{ij}$ near $m_j$ side, and the values of these two pressure degrees of freedom are generally different. Therefore, for an effective m-f connection, if the fracture f is projected on the interface 1 of the matrix grid, the additional degree of freedom added for the connection is judged to be located on the m side of 1. For an effective $(m_i, m_j)$ connection, the pressure degree of freedom is located on both sides of $I_{ij}$. In general, it is based on the matrix grid in the connection to solve the pressure degree of freedom added to the connection on which side of the corresponding matrix grid surface is located.

(iv) The concept of average pressure on the matrix grid surface needs to be introduced. Since the pressure on the grid surface is needed to obtain the MFD flow operator in the matrix grid, pEDFM is different from EDFM as mentioned above. It may have multiple connections on the matrix grid surface, not only the m-m connections in EDFM, but also the original m-m connections may be completely replaced by other m-f connections. At this time, if the value of the pressure degree of freedom added to the different connections is subdivided on each grid surface to participate in the construction of the transmissibility matrix based on MFD in the matrix grid, the complexity of the algorithm will be significantly increased and the robustness and practicability of the algorithm will be reduced. Therefore, when constructing the transmissibility matrix based on MFD in the matrix grid, the average pressure on the side of the matrix grid surface close to the matrix grid surface should be used (it should be noted that, as mentioned above, the matrix grid surface may have different average pressures on two sides of the matrix grid surface). The average pressure is a weighted average of the additional pressure degrees of freedom added by each effective connection on the side of the matrix grid surface near the matrix grid with the corresponding flow area as the weight. As shown in FIG. 2(b), the average pressure $\bar{p}_{1_{ij}}^{m_i}$ of the side near $m_i$ of $1_{ij}$ and the average pressure $\bar{p}_{1_{ij}}^{m_i}$ of the side near $m_i$ of 1 are calculated as follows:

$$\bar{p}_{1_{ij}}^{m_i} = \frac{p_{(m_i, f_i)} A_{(m_i, f_i)} + p_{(m_i, m_j)} A_{(m_i, m_j)}}{A_{(m_i, f_i)} + A_{(m_i, m_j)}}, \quad (26)$$

$$\bar{p}_{1_{ij}}^{m_j} = \frac{p_{(m_j, f_i)} A_{(m_j, f_i)} + p_{(m_i, m_j)} A_{(m_i, m_j)}}{A_{(m_j, f_i)} + A_{(m_i, m_j)}}$$

wherein, $p_{(m_i, f_j)}$, $p_{(m_j, f_i)}$ and $p_{(m_i, m_j)}$, and are the pressure degrees of freedom added for $(m_i, f_i)$, $(m_j, f_i)$ and $(m_i, m_j)$, respectively, $A_{(m_i, f_j)}$, $A_{(m_j, f_i)}$ and $A_{(m_i, m_j)}$ are the corresponding flow areas of $(m_i, f_i)$, $(m_j, f_i)$ and $(m_i, m_j)$, respectively. It can be seen that the pressure on the left and right sides of $1_{ij}^1$ is discontinuous, the average pressure on the left and right sides of $1_{ij}$ is no longer continuous. Of course, if there is no fracture projection on the matrix grid surface, the average pressure on both sides of $1_{ij}$ can be calculated to be continuous, which degenerates into the case in EDFM.

4.2 Basic Concepts

Concept 1: effective connection

Since the generic pEDFM workflow adopts the non-projection processing method of transmissibility multiplier for low-conductivity fractures, this section first ignores low-conductivity fractures, and at this time, the connection set between grids $Cont_1$ can be obtained, the transmissibility of the corresponding connection is calculated according to Eq. (19) to Eq. (25), and the corresponding flow area is also reflected in these transmissibility calculation formulas. In $Cont_1$, the set of connections with flow area of 0 is $Cont_1^0$, it can be seen that the transmissibility of the connection in $Cont_1^0$ must be 0, and it has no effect on the results of simulation calculation. Taking FIG. 2 as an example, $C(m_i, m_j) \in Cont_1^0$, therefore, the effective set in definition $Cont_1$ is $Cont_1^{eff}$.

$$Cont_1^{eff} = Cont_1 - Cont_1^0 \quad (27)$$

Concept 2: $Cont_1^{eff}(1_{ij}^{m_i})$ and the corresponding pressure degree of freedom It can be seen from the basic theory of MFD in 2.2, since the permeability of fracture grip is generally isotropic, when pEDFM is constructed based on MFD, there is no need to change the original f-f connections and the corresponding transmissibility in $Cont_1^{eff}$. However, the permeability of the matrix grid may be in the full tensor form, so it is necessary to construct an additional pressure degree of freedom for each m-m and f-m connection in $Cont_1^{eff}$. As mentioned above, pEDFM essentially projects the fracture grid in the matrix grid to the intersection surface of the matrix grid to form an approximate DFM to deal with. It can be considered that each m-m and f-m effective connection increases. A pressure degree of freedom is located on the matrix grid surface associated with the connection. For example, $(m_i, f_i)$ in FIG. 2(b), The additional pressure degree of freedom $p_{(m_i, f_i)}$ is considered to be on the side of $1_{ij}$ near $m_i$. Let $1_{ij}^{m_i}$ be the side of $1_{ij}$ near $m_i$, $1_{ij}^{m_j}$ is the side of $1_{ij}$ near $m_j$. Then, it is possible to define the effective connection set associated with $1_{ij}^{m_i}$ as a set of connections in which the added pressure degree of freedom in $Cont_1^{eff}$ is located in $1_{ij}^{m_i}$, noting $Cont_1^{eff}(1_{ij}^{m_i})$, the flow area of the corresponding connection and the increased pressure degree of freedom are $A_\zeta$ and $p_\zeta$, respectively, $\zeta \in Cont_1^{eff}(1_{ij}^{m_i})$. It should be pointed out that the increased pressure degree of freedom of the original m-f connection may fall on two substrate grids, such as $f_i$ in FIG. 2(c), it is due to the projection in the x direction and they direction, respectively, therefore, $(f_i, m_i) \in Cont_1^{eff}(1_{ij}^{m_i})$ and $(f_i, m_i) \in Cont_1^{eff}(1_{ik}^{m_i})$, the corresponding flow area should not be fracture area, but $A(f_{i,1_{ij}}^P)$ and $A(f_{i,1_{ik}}^P)$, respectively.

Concept 3: Average Pressure of Matrix Grid Surface

From the MFD theory of 2.2, it can be seen that in the case of full permeability tensor, the outward normal flux on one side of the grid is also related to the pressure on other sides of the grid. Therefore, the average pressure $\bar{p}_{ij}^i$ on one side of the matrix grid is defined to participate in the calculation of the outward normal flux on the side of the matrix grid based on MFD and the calculation is as follows:

$$\bar{p}_{1_{ij}^{mj}}^{m_i} = \frac{\sum_{\xi \in Cont_1^{eff}(1_{ij}^{mj})} p_\xi A_\xi}{\sum_{\xi \in Cont_1^{eff}(1_{ij}^{mj})} A_\xi} \quad (28)$$

4.3 Treatment of Low-Conductivity Fractures

As described in 3.2, the generic pEDFM uses the transmissibility multiplier method to deal with low-conductivity fractures, so that pEDFM can generally model various low-conductivity fractures. The transmissibility multipliers are based on the harmonic average scheme in TPFA, and the transmissibility of each connection affected by the low-conductivity fractures is updated with the transmissibility of the low-conductivity fractures. Let $f_l$ be a low-conductivity fracture, and its permeability and fracture width are $k_f$ and $w_f$, respectively. Considering that the fracture grid in the pEDFM of the invention still adopts the transmissibility based on TPFA, the connection affected by low-conductivity fractures is divided into the following three treatment methods according to different connection types:

i) for f-f connections, it may be set to $f_i$ and $f_j$, and the $f_i$-$f_j$ transmissibility before being affected by $f_l$ is:

$$T_{f_i f_j} = (T_{f_i}^{-1} + T_{f_j}^{-1})^{-1} \quad (29)$$

then the transmissibility affected by $f_l$ is:

$$T_{f_i f_j} = \left(T_{f_i f_j}^{-1} + T_{f_l}^{-1}\right), \; T_{f_l} = \frac{k_{f_l} A_{(f_i, f_j)}}{w_{f_l}/2} \quad (30)$$

wherein, $A_{(f_i, f_j)}$ is the flow area of $(f_i, f_j)$.

if there are other low-conductivity fractures that affect the connection, then the Eq. (29) continues to be updated.

ii) For m-f connections, it may be set to $m_i$ and $f_j$, suppose that a transmissibility off in the $m_i$-$f_j$ connections is not affected by $f_l$, the original transmissibility of $f_j$ is based on the TPFA's $T_{f_j}$, the influence of $f_l$ is applied to $f_j$, which is equivalent to connecting the low-conductivity fracture $f_l$ with $f_j$ in series, that is, the transmissibility off is updated as:

$$T_{f_j} = (T_{f_j}^{-1} + T_{f_l}^{-1})^{-1} \quad (31)$$

if there are other low-conductivity fractures that affect the $m_i$-$f_j$ connections, then use Eq. (31) to continue to update $T_{f_j}$.

iii) for m-m connections, it may be set to $m_i$ and $f_j$, since there is no fracture grid available for the harmonic averaging scheme, it is necessary to split the $m_i$-$m_j$ connections into two m-f connections, they are $m_i$-$f_l$ and $m_j$-$f_l$ respectively, and the flow area of these two connections is $(m_i, m_j)$ flow area $A_{(m_i, m_j)}$, wherein the transmissibility off is:

$$T_{f_l} = \frac{k_{f_l} A_{(m_i, m_j)}}{w_{f_l}/2} \quad (32)$$

If there are other low-conductivity fractures (such as $f_k$), then the transmissibility off is updated with the transmissibility of $f_k$ by Eq. (31), that is:

$$T_{f_l} = (T_{f_l}^{-1} + T_{f_k}^{-1})^{-1}, \; T_{f_k} = \frac{k_{f_k} A_{(m_i, m_j)}}{w_{f_k}/2} \quad (33)$$

It can be seen that the treatment of low-conductivity fractures in this section will add new connections in $Cont_1^{eff}$, and the updated $Cont_1^{eff}$ is recorded as $Cont_2^{eff}$.

4.4 Numerical Flux Calculation of Effective Connection

Let the number set of the matrix grid which is adjacent to the matrix grid $m_i$ be $neigh_{m_i}$, then the set of effective connections on each side of $m_i$ near $m_i$ is:

$$Cont_2^{eff}(m_i) = \bigcup_{j \in neigh_{m_i}} Cont_2^{eff}(1_{ij}^{m_i}),$$

according to Eq. (28), the conversion formula between the average pressure of each side of $m_i$ near $m_i$ and the value of pressure degree of freedom added by each connection in $Cont_1^{eff}(m_i)$ can be obtained as follows:

$$\bar{p}_{m_i} = A p_{m_i} \quad (34)$$

wherein $\bar{p}_{m_i}$ is a column vector composed of $\bar{p}_{ij}^{m_i}$ ($j \in neigh_{m_i}$), $p_{m_i}$ is a column vector composed of $p_j(j \in Cont_2^{eff}(m_i))$, each j row of A represents the area weight when the average pressure of the jth surface of $m_i$ near $m_i$ is calculated by Eq. (28), meanwhile, $A^T$ is the distribution matrix of the numerical flux on each surface of $m_i$ to the flow on each connection in $Cont_1^{eff}(m_i)$:

$$flux_i = A^T \overline{flux_i} \quad (35)$$

Firstly, it is judged whether the matrix grid $m_i$ is K orthogonal, if yes, then the transmissibility matrix $T^{m_i}$ in $m_i$ is calculated by using the Eq. (9) based on TPFA, if not, then the transmissibility matrix $T^{m_i}$ in $m_i$ is calculated by using the MFD-based Eq. (12). As mentioned above, the average pressure is used to participate in the calculation of the numerical flow on each surface of the matrix grid, so it can be obtained that:

$$\overline{flux_i} = T^{m_i} \bar{p}_{m_i} = T^{m_i} A p_{m_i} = T^{m_i} A(p_{m_i} I - p_{m_i}) \quad (36)$$

wherein, I is a column vector, wherein one of the elements is 1 and the length is the number of effective connections of the matrix grid.

Furthermore, combining Eq. (35) and Eq. (36), it is obtained that:

$$flux_i = A^T T^{m_i} A(p_{m_i} I - p_{m_i}) \quad (37)$$

Therefore, for the matrix grid, the actual transmissibility matrix is:

$$\tilde{T}^{m_i} = A^T T^{m_i} A \quad (38)$$

4.4 Global Equation

By using the transmissibility matrix given in Eq. (38), the flux on each connection related to $m_i$ can be calculated, by taking $\tilde{T}^{m_i}$ into Eq. (15), the discrete scheme of the continuity equation in $m_i$ can be obtained:

$$\sum_{\beta \in Cont_1^{eff}(m_i)} \frac{k_{r\alpha,i\beta}}{\mu_{\alpha,i\beta} B_{\alpha,i\beta}} \sum_{\gamma \in Cont_1^{eff}(m_i)} \tilde{t}_{i\gamma}^{\alpha}(p_\gamma^{t+\Delta t} - p_{m_i}^{t+\Delta t}) + Q_\alpha = \quad (39)$$

-continued $$\frac{|\Omega_i|}{\Delta t}\left[\left(\frac{\phi S_a}{B_a}\right)_{m_i}^{t+\Delta t} - \left(\frac{\phi S_a}{B_a}\right)_{m_i}^{t}\right]$$

For a fracture grid $f_j$, its transmissibility still adopts a simple TPFA scheme, the efficient connections $Cont_2^{\text{eff}}$ ($f_j$) related to $f_j$ include f-f connections ($Cont_{fj}^{f-f}$) and m-f connections ($Cont_{fj}^{m-f}$), the set of fracture grids adjacent to $f_j$ reflected from $Cont_{fj}^{f-f}$ is denoted as $neigh_{f_j}$, then the discrete scheme of the continuity equation in $f_j$ can be written as Eq. (40). It should be emphasized that the reason why the form of the mass transfer part corresponding to the f-f connections in Eq. (40) is different from the form of the mass transfer part corresponding to the m-f connections is that: in this work, in order to reduce the computational cost and algorithm complexity, no additional pressure degree of freedom is added to the f-f connections. Therefore, the mass transfer corresponding to the f-f connections is directly expressed in a numerical flux expression similar to that in Eq. (14) using grid average pressure and TPFA.

$$\sum_{\beta \in Cont_{fj}^{m-f}} \frac{k_{ra,i\beta}}{\mu_{a,i\beta}B_{a,i\beta}} \sum_{\gamma \in Cont_{fj}^{m-f}} \tilde{T}_{\beta,\gamma}^{\varphi n_i}\left(p_\gamma^{t+\Delta t} - p_{f_j}^{t+\Delta t}\right) + \quad (40)$$

$$\sum_{\beta \in neigh_{f_j}} \frac{k_{ra,i\beta}}{\mu_{a,i\beta}B_{a,i\beta}} T_{f_j\beta}\left(p_\beta^{t+\Delta t} - p_{f_j}^{t+\Delta t}\right) + Q_a =$$

$$\frac{|\Omega_{f_j}|}{\Delta t}\left[\left(\frac{\phi S_a}{B_a}\right)_{f_j}^{t+\Delta t} - \left(\frac{\phi S_a}{B_a}\right)_{f_j}^{t}\right]$$

Meanwhile, when $\tilde{T}^{\varphi n_i}$ of each matrix grid is obtained, the transmissibility of all effective m-m connections and m-f connections matrix grids is known, and the transmissibility of the fracture grid in the m-f connections is still based on the TPFA scheme. Therefore, the continuity conditions of each m-m connection and m-f connection in $Cont_2^{\text{eff}}$ can be given.

For m-m connections, suppose that is $m_i$ and $m_k$, then:

$$\text{flux}_{m_i \to m_k} = \tilde{T}_{m_k}^{\varphi n_i}(p_{m_i}I - p_{m_i}), \text{flux}_{m_k \to m_i} = \tilde{T}_{m_k}^{\varphi n_i}(p_{m_i}I - p_{m_i}) \quad (41)$$

The corresponding flux continuity condition is: $\tilde{T}_{m_k}^{\varphi n_i}(p_{m_i}I - p_{m_i}) + \tilde{T}_{m_k}^{\varphi n_i}(p_{m_i}I - p_{m_i}) = 0$ (42)

For m-f connections, suppose that is $m_i$ and $f_j$, then:

$$\text{flux}_{m_i \to f_j} = \tilde{T}_{g,\gamma}^{\varphi n_i}\left(p_{m_i}I - p_{m_i}\right), \text{flux}_{f_j \to m_i} = T_{f_j}\left(p_{f_j} - p_{(m_i,f_j)}\right) \quad (43)$$

The corresponding flux continuity condition is:

$$\tilde{T}_{f_j}^{\varphi n_i}(p_{m_i}I - p_{m_i}) + T_{f_j}(p_{f_j} - p_{(m_i,f_j)}) = 0 \quad (44)$$

For f-f connections, because the present invention still uses the transmissibility formula in Eq. (18) and Eq. (24) without defining additional pressure degrees of freedom in the generic pEDFM, there is no additional flow continuity condition for f-f connections.

In general, let the reservoir calculation domain contain $n_m$ matrix grids and $n_f$ fracture grids, the number of m-m and m-f connections contained in $Cont_2^{\text{eff}}$ is $n_c$. The pressure degrees of freedom of the new pEDFM include $n_m$ matrix grid center pressure, $n_f$ fracture grid average pressure, and $n_c$ additional pressure degrees of freedom, a total of $n_m+n_f+n_c$, the degree of freedom of water saturation includes $n_m$ matrix grid average saturation and $n_f$ fracture grid average saturation, a total of $n_m+n_f$, therefore, the global degree of freedom is $2(n_m+n_f)+n_c$. The global equations include a continuity equation of $2n_m$ matrix grids (including oil phase and water phase, and therefore $2n_m$, not $n_m$), that is also the Eq. (39), the continuity equation of $n_f$ fracture grids (including oil phase and water phase), namely Eq. (40), and $n_c$ flux continuity conditions composed of Eq. (42) and Eq. (44), Therefore, the global equations are also $2(n_m+n_f)+n_c$, and it can be closed solution. The nonlinear solver based on Newton-Raphson (NR) iteration is used to solve the global equations to obtain the pressure and water saturation distribution at each time.

Example 1

Figure 3:
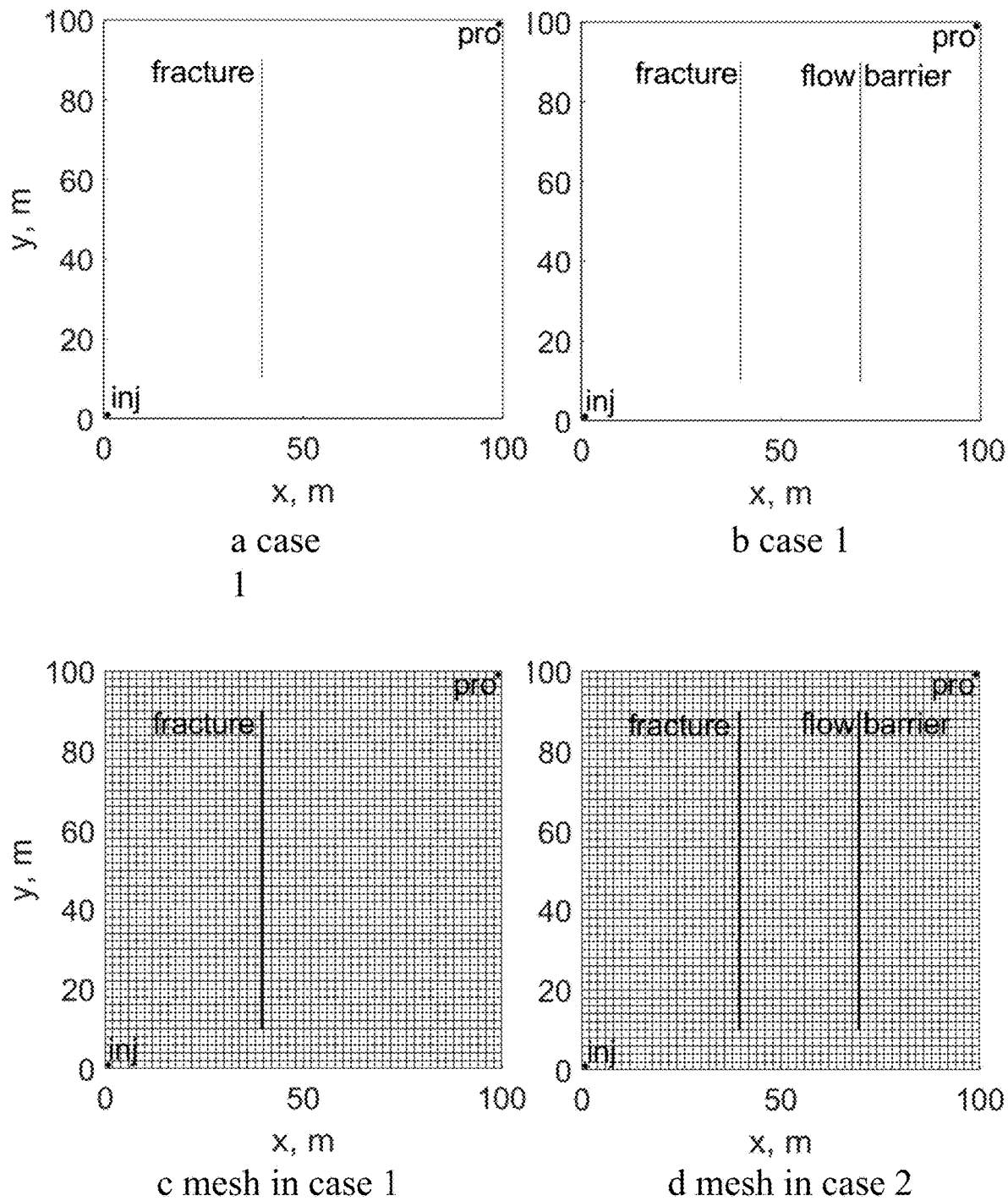
FIG. 3 is a Cartesian background grid corresponding to the reservoir model and the reservoir model of example 1.

FIGS. 3(a) and (b) show two reservoir models in this case, in which the first model contains only one high-conductivity fracture consistent with the coordinate line, and the second model has an additional flow barrier. There is a water injection well and a production well in the lower left corner and the upper right corner of the reservoir respectively. FIGS. 3(c) and (d) show the Cartesian background grid of the two models. The reservoir permeability is the anisotropic permeability tensor of the principal axis in the x and y directions in Eq. (45). The relative permeability function is shown in Eq. (46), and the other physical parameters are shown in table 1.

$$K = \begin{bmatrix} 80 & 0 \\ 0 & 10 \end{bmatrix} mD \quad (45)$$

$$k_{rw} = 0.8\left(\frac{S_w - 0.2}{1 - 0.2 - 0.2}\right)^2, k_{ro} = 0.552\left(\frac{1 - 0.2 - S_w}{1 - 0.2 - 0.2}\right)^2 \quad (46)$$

Table 1 Physical Parameters of Reservoir Model

| Physical parameters | The value | Physical parameters | The value |
|---|---|---|---|
| Original formation pressure | 15 MPa | Water phase viscosity | 0.6 mPa · s |
| Initial water saturation | 0.2 | Reference pressure | 15 MPa |
| Thickness | 5 m | Oil phase compressibility coefficient | $1 \times 10^{-3}$ MPa$^{-1}$ |
| Matrix porosity | 0.12 | Water phase compressibility coefficient | $5 \times 10^{-4}$ MPa$^{-1}$ |

-continued

| Physical parameters | The value | Physical parameters | The value |
|---|---|---|---|
| Fracture porosity | 0.4 | Matrix compressibility coefficient | $1 \times 10^{-4}$ MPa$^{-1}$ |
| Fracture permeability | 100000 mD | Fracture compressibility coefficient | $1 \times 10^{-4}$ MPa$^{-1}$ |
| Fracture aperture | 0.01 m | Oil phase volume coefficient under reference pressure | 1.0 |
| Fracture permeability of blocking fracture | 0 mD | Water phase volume coefficient under reference pressure | 1.0 |
| Oil phase viscosity | 2 mPa · s | | |

Figure 4:
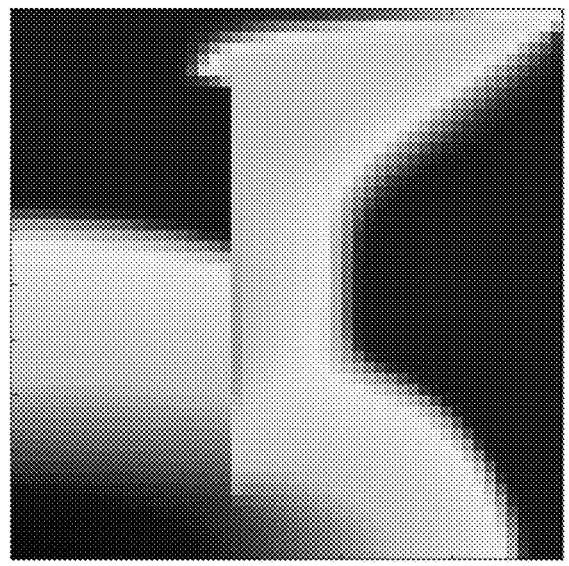
FIG. 4 shows a water saturation distribution at 200 days calculated by different methods in case 1 of the example 1.
Figure 4:
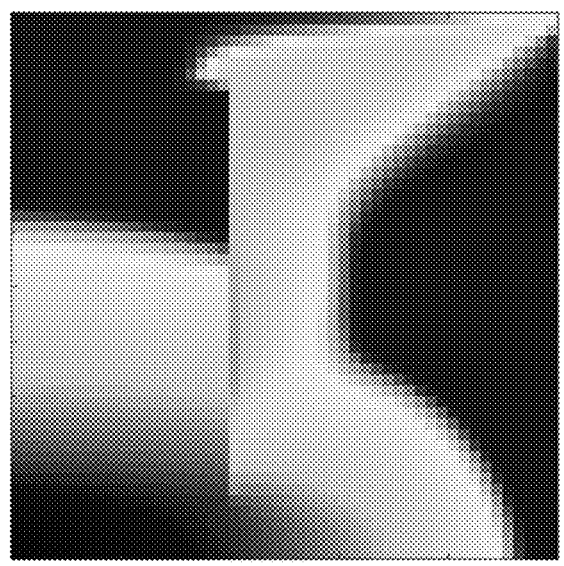
Figure 4:
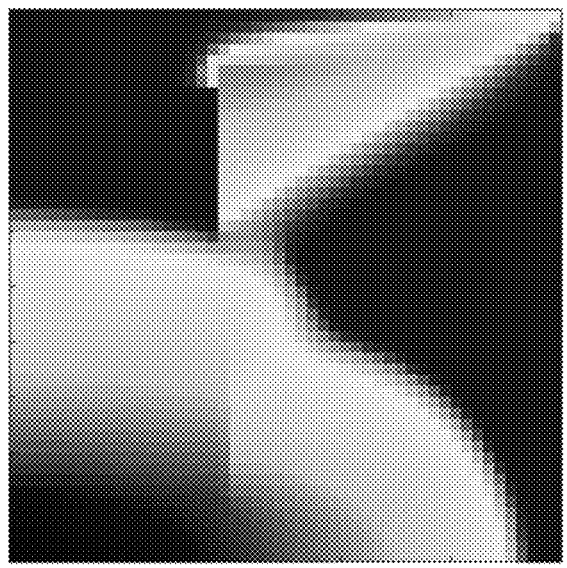
Figure 4:
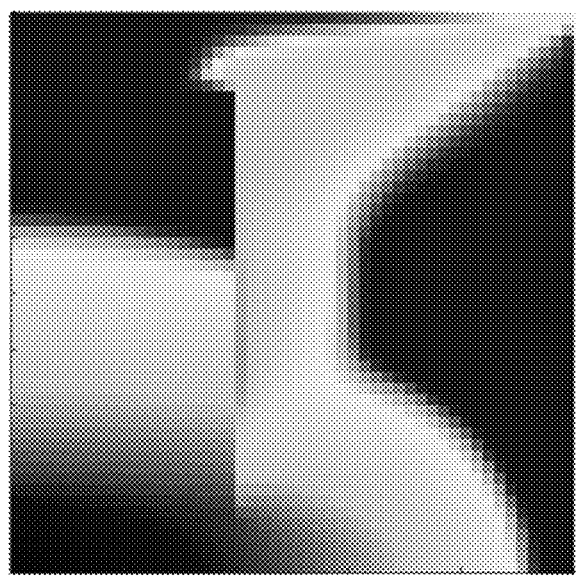
Figure 5:
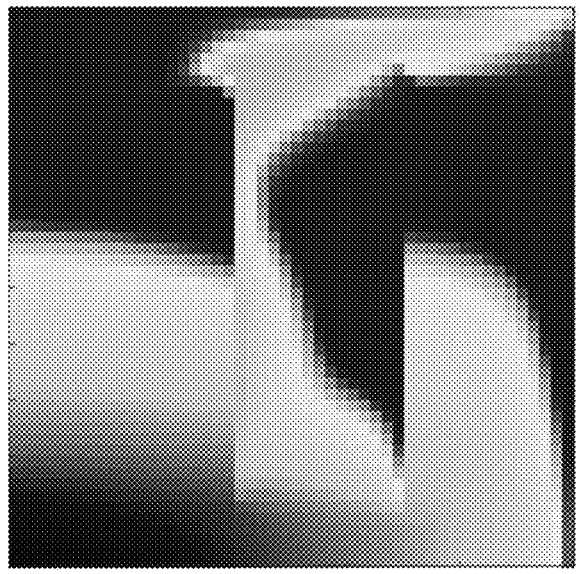
FIG. 5 shows a water saturation distribution at 200 days calculated by different methods in case 2 of the example 1.
Figure 5:
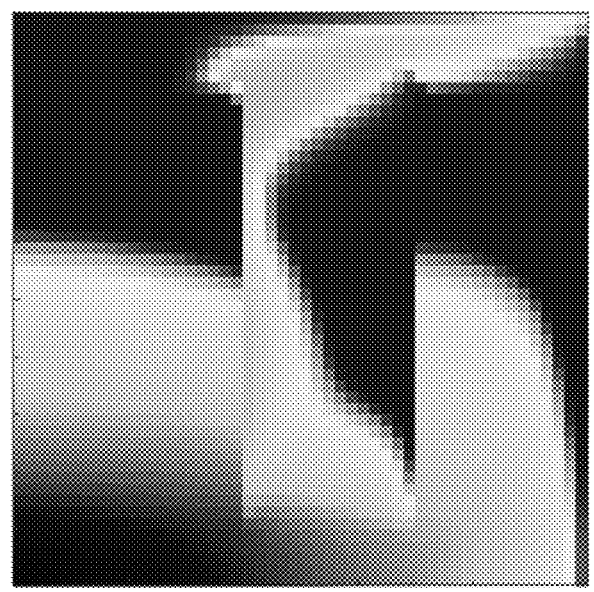
Figure 5:
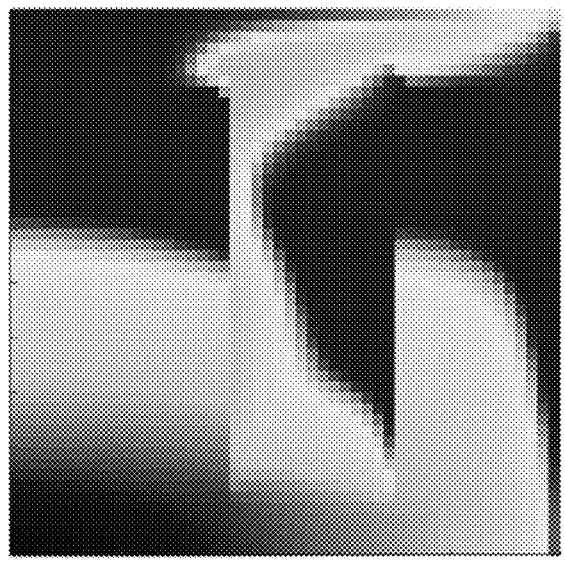
Figure 5:
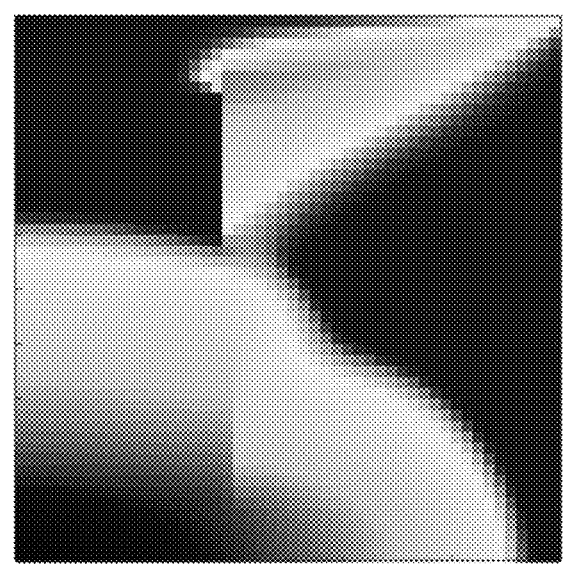
Figure 6:
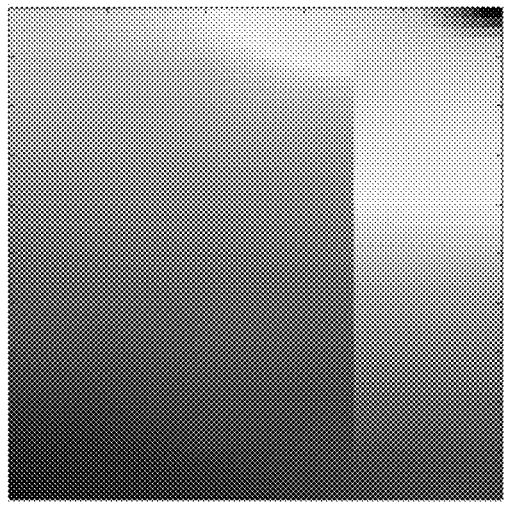
FIG. 6 is a pressure distribution of 200 days calculated by different methods in case 2 of the example 1.
Figure 6:
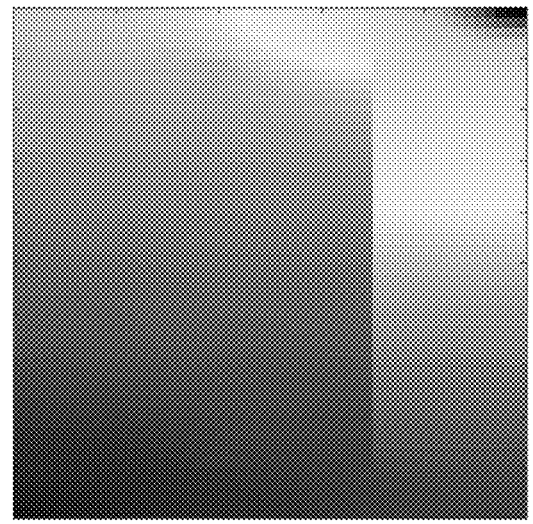
Figure 6:
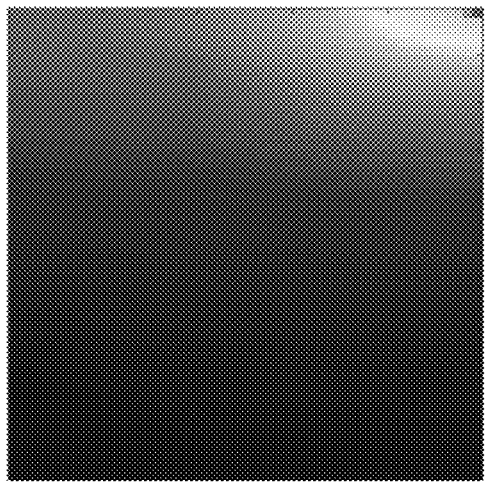
Figure 6:
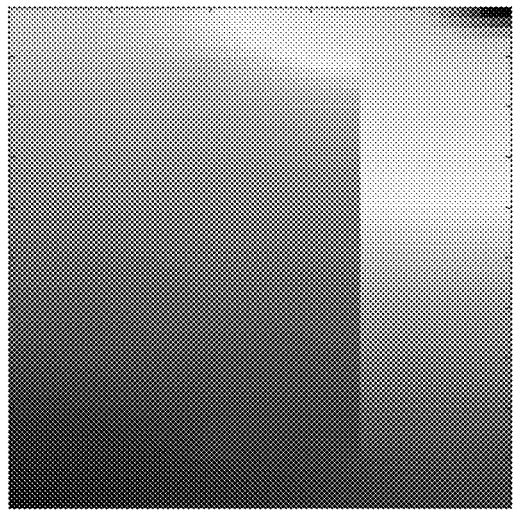
Figure 7:
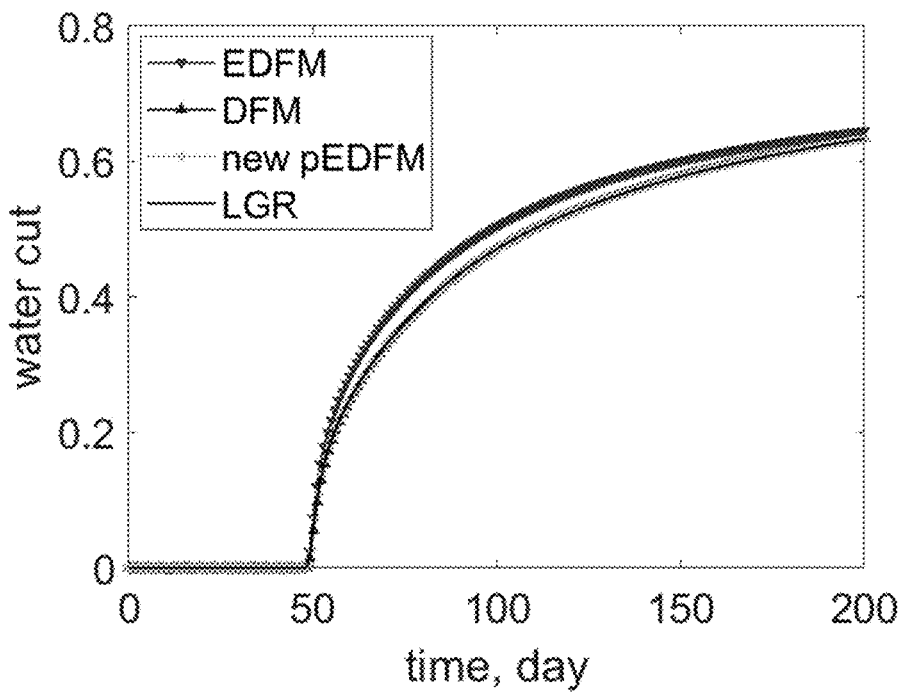
FIG. 7 is a water cut curve of production wells in case 1 and case 2 of the example 1.
Figure 7:
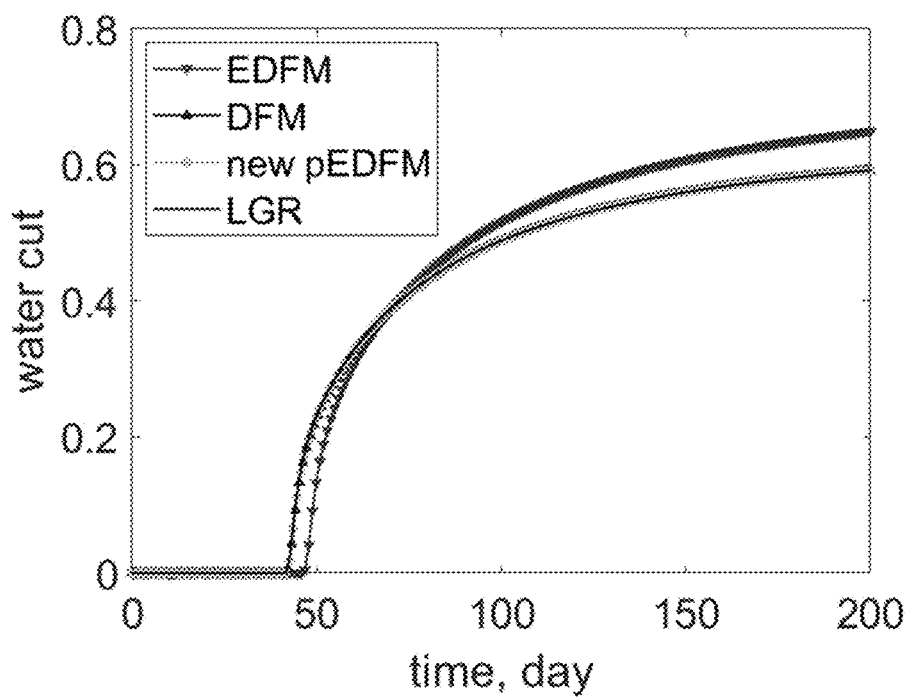

At this time, the Cartesian grids are K-orthogonal, and the reference solution can be obtained by local grid refinement (LGR) and the finite volume method based on TPFA. FIG. 4 compares the water saturation distribution at 200 days calculated by LGR, new pEDFM, EDFM and DFM at case 1. FIG. 5 and FIG. 6 compare the water saturation and pressure distribution at 200 days calculated by LGR, new pEDFM, EDFM and DFM at case 2, respectively. FIG. 7 compares the water cut curves of production wells in case 1 and case 2. It can be seen that the new pEDFM can achieve almost the same saturation, pressure distribution and well response results as LGR and DFM. However, EDFM produces significant errors when simulating two-phase flow across high-conductivity fractures in case 1. The flow barrier in case 2 did not prevent the flow of injected water in EDFM, and the pressure distribution calculated by EDFM did not reflect the discontinuity of pressure on both sides of the flow barrier. The dynamic data of oil wells calculated by EDFM are also significantly different from the reference solution. The analysis of the results of this example shows that the new pEDFM can effectively solve the limitations of EDFM in the applicability of flow scenarios.

Example 2

Figure 8:
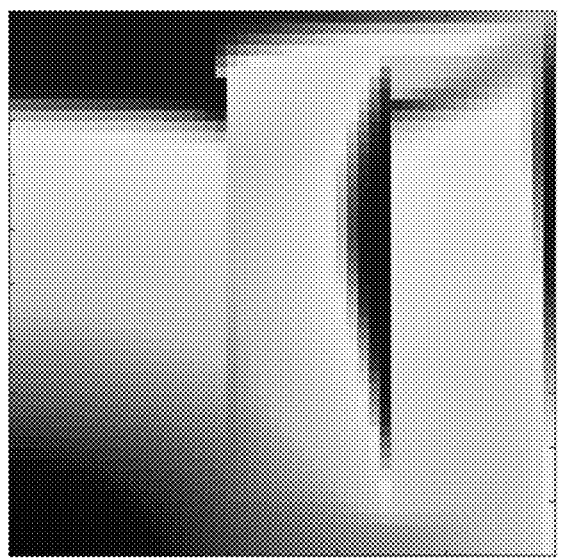
FIG. 8 is a distribution of water saturation at 200 days calculated by different methods in case 2 of the example 2.
Figure 8:
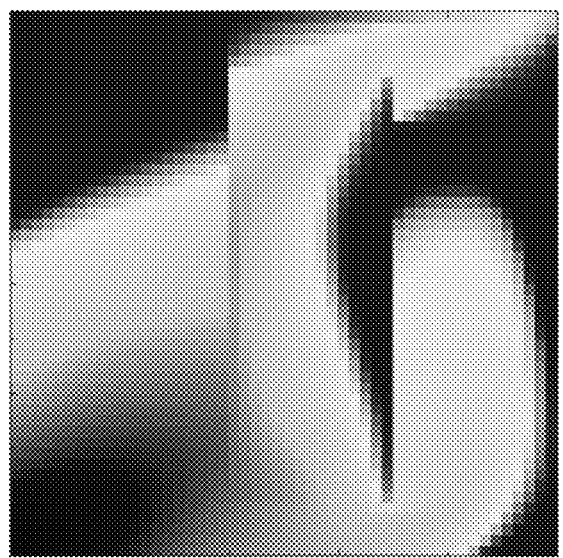
Figure 8:
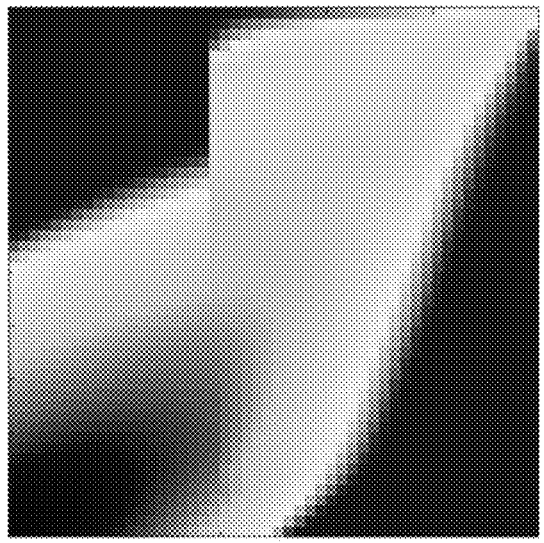
Figure 8:
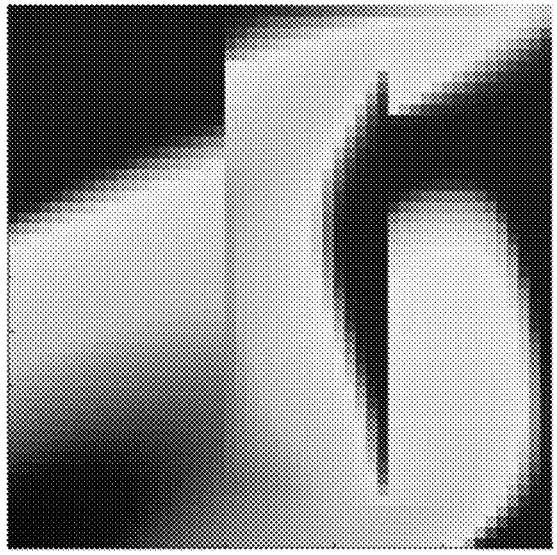
Figure 9:
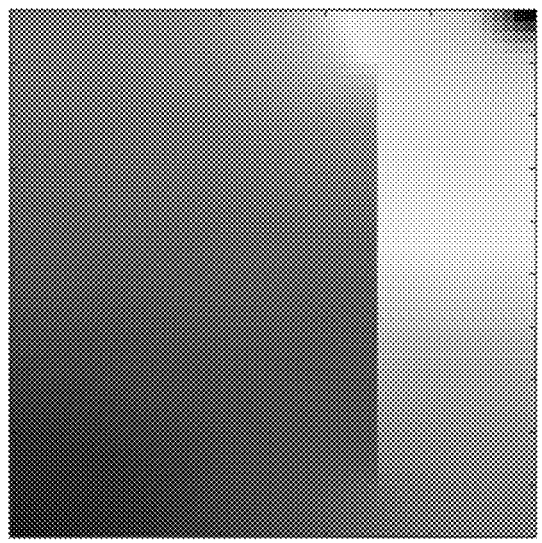
FIG. 9 shows a pressure distribution at 200 days calculated by different methods of the example 2.
Figure 9:
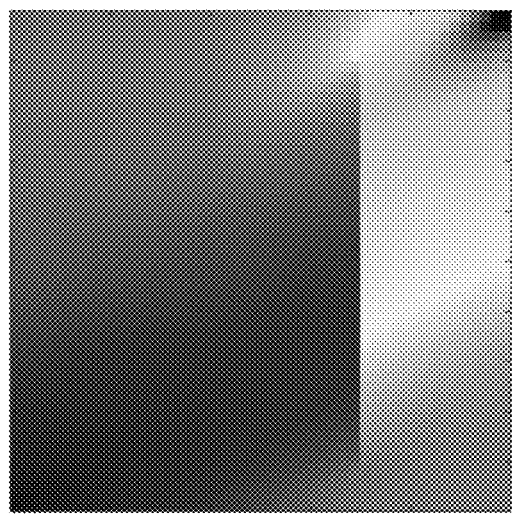
Figure 9:
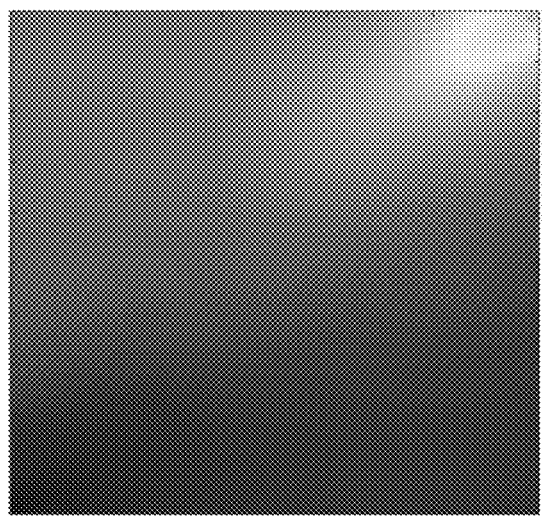
Figure 9:
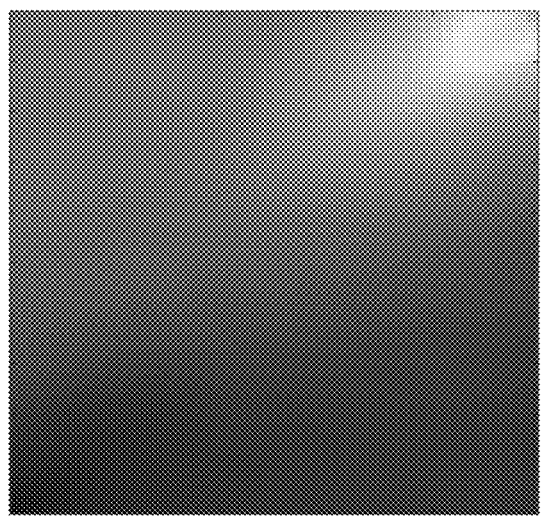
Figure 10:
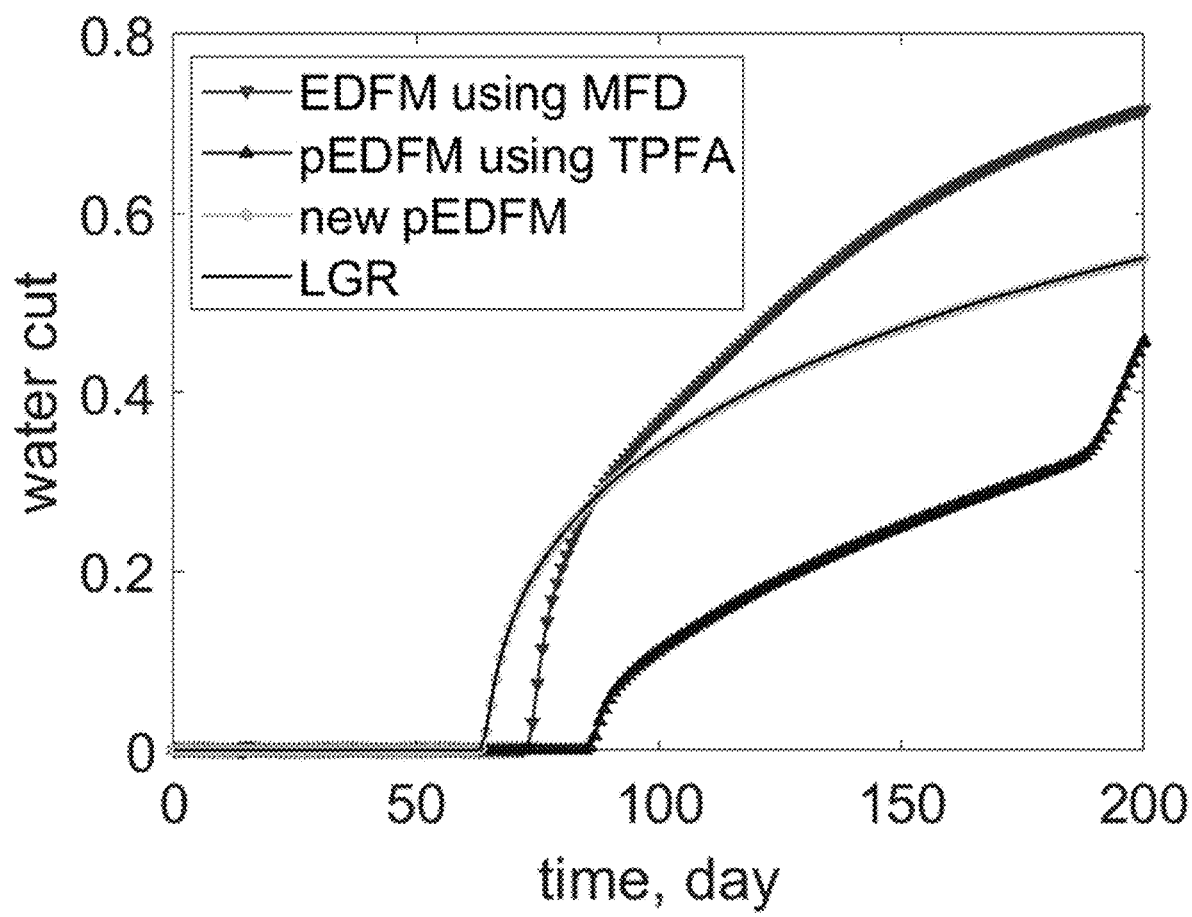
FIG. 10 is a water cut curve of production wells calculated by different methods of the example 2.

Keeping the reservoir model and physical parameters of case 2 in case 1 unchanged, only the permeability tensor in Eq. (46) is rotated by 30 degrees to obtain the full permeability tensor in Eq. (47). Theoretically, TPFA will not be able to obtain high-precision numerical flux approximation at this time. Taking the DFM solution based on MFD as the reference solution, FIG. 8 and FIG. 9 compare the water saturation and pressure distribution at 200 days calculated by pEDFM using TPFA, new pEDFM, and EDFM using MFD, respectively. FIG. 10 compares the water cut curves of production wells calculated by different methods. It can be seen that: (i) the new pEDFM can obtain almost the same calculation results as the reference solution, and the calculated water flooding front and pressure distribution accurately reflect the principal axis direction of the permeability tensor in Eq. (47) (i.e., the angle with the coordinate axis is 30 degrees). (ii) Although the pEDFM using TPFA can simulate the blocking effect of the flow barrier on the flow, the difference with the reference solution is still very obvious. From the calculated water drive front and pressure distribution, it can be seen that the use of TPFA to estimate the numerical flux leads to its failure to accurately grasp the principal axis direction of the permeability tensor in Eq. (47), and mistakenly believe that the principal axis direction of the permeability tensor is x direction and y direction. (iii) The EDFM using MFD fails to effectively characterize the role of the flow barrier, which is also reflected in case 2 of the first case, but the numerical flux approximation based on MFD enables EDFM to simulate a water flooding front with an inclination of about 30 degrees on the left side of the high-conductivity fracture.

$$K = \begin{bmatrix} 62.5 & 30.3109 \\ 30.3109 & 27.5 \end{bmatrix} mD \qquad (47)$$

The above results demonstrate that the new pEDFM can achieve high-precision simulation results for the case with full permeability tensor, while the pEDFM using TPFA and the EDFM using MFD will have significant errors.

Example 3

Figure 11:
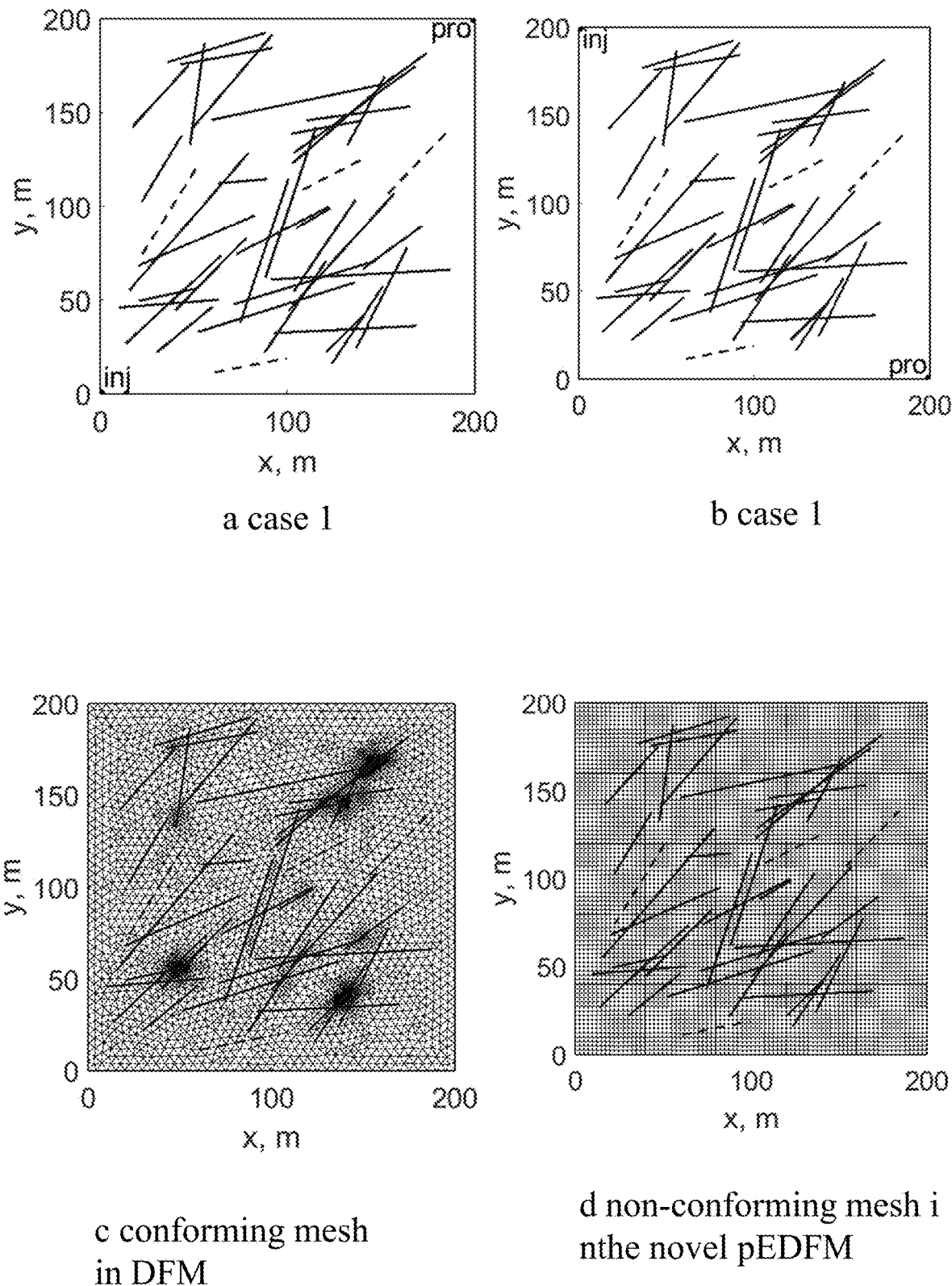
FIG. 11 is a reservoir model and grid of the new pEDFM and DFM of the example 5.

In this example, a more complex implementation example will be used to show the application effect of the new pEDFM, and to test that the new pEDFM can achieve the same calculation accuracy as DFM in the case of more complex slit network, and to show the advantages of the new pEDFM in grid generation compared with DFM. As shown in FIG. 11, the reservoir model of this implementation case contains 36 high-conductivity fractures marked with solid lines and 4 flow barriers marked with dotted lines. The permeability of anisotropic reservoir is the full permeability tensor in Eq. (47). The initial pressure and reference pressure of the reservoir are both 20 MPa. The other physical parameters are the same as those in table 1, and the relative permeability data are the same as that in Eq. (46). Wherein, the injection-production wells in case1 are located in the lower left corner and the upper right corner of the reservoir, and the injection-production wells in case2 are located in the upper left corner and the lower right corner of the reservoir. FIGS. 13(c) and (d) show the matching grid used by DFM and the non-matching grid used by the new pEDFM, respectively. It can be seen that when generating the matching grid for the complex fracture network, a large number of small grids will be generated in the narrow area between the fractures, so that the number of generated grids is large and the generation of grids is difficult. Practice shows that in the case of more complex fracture grids, even some mature triangular (tetrahedral) grid generation software cannot generate grids that match the geometric structure of the fracture network.

Figure 12:
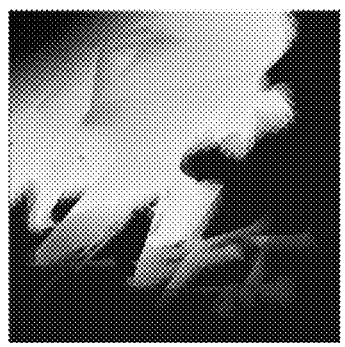
FIG. 12 shows a water saturation and pressure distribution after 400 days and 600 days obtained by different calculation methods of the example 5.
Figure 12:
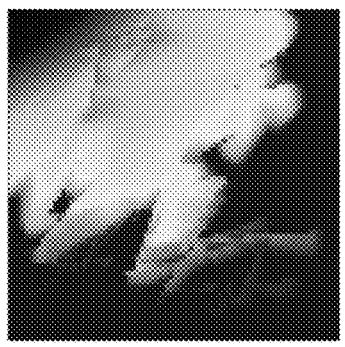
Figure 12:
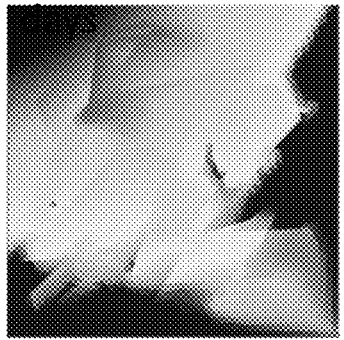
Figure 12:
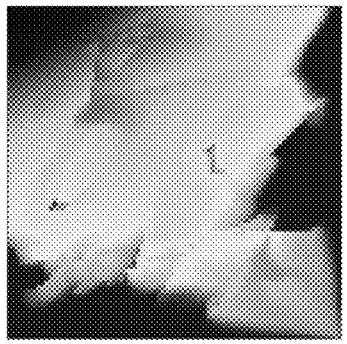
Figure 12:
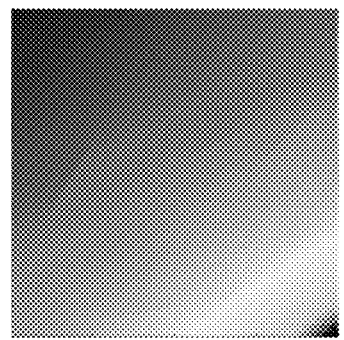
Figure 12:
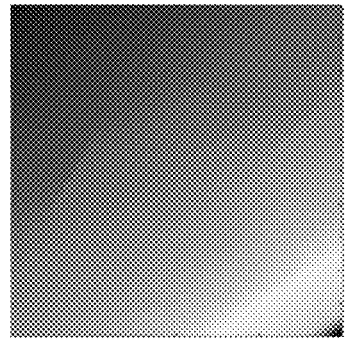
Figure 12:
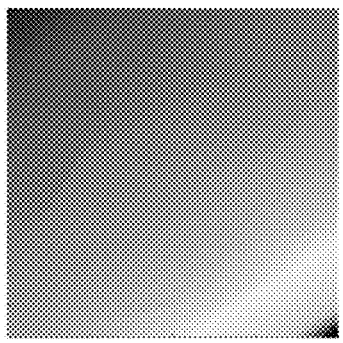
Figure 12:
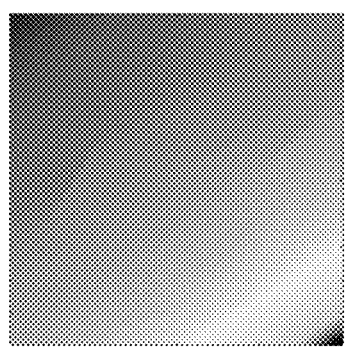
Figure 13:
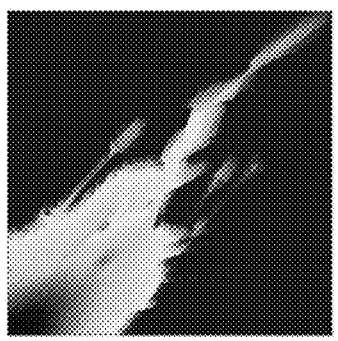
FIG. 13 is a comparison of water saturation and pressure distribution after 200 days and 600 days obtained by different calculation methods in case 2 of the example 5.
Figure 13:
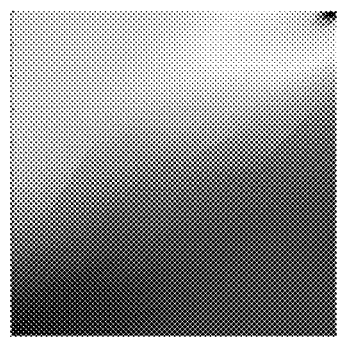
Figure 13:
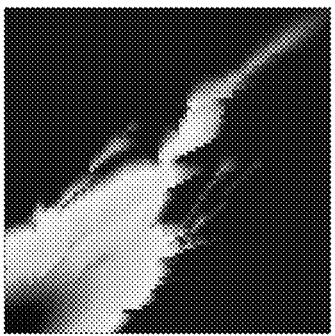
Figure 13:
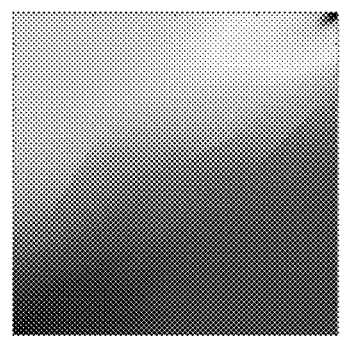
Figure 13:
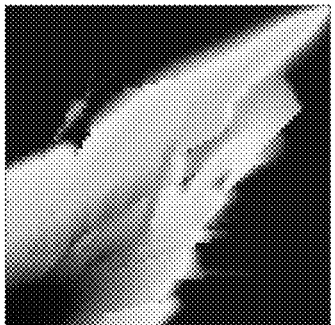
Figure 13:
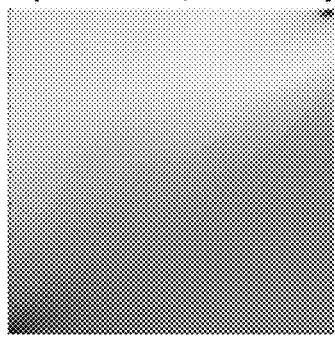
Figure 13:
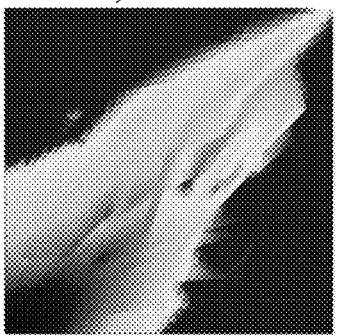
Figure 13:
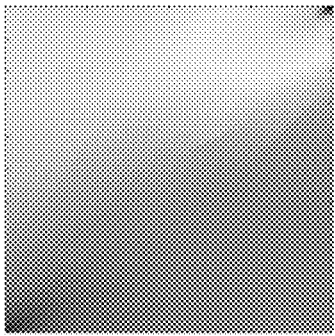

FIG. 12 and FIG. 13 compare the water saturation and pressure distribution after 400 days and 600 days calculated by DFM and new pEDFM in case1 and case 2, respectively. It can be seen intuitively that the new pEDFM can achieve the same calculation accuracy as DFM in case1 and case 2. It is shown that the new pEDFM is more practical than the DFM for implementations with complex grids.

Therefore, the present invention adopts a projection embedded DFM based on the hybrid method of TPFA and MFD, wherein the new pEDFM can deal with anisotropic reservoirs with full permeability tensor. For the first time, the implementation of TPFA-MFD (or MFD) is realized in the pEDFM framework, which significantly expands the original generic pEDFM using TPFA as a special case of the new pEDFM in the case of K-orthogonal grids, and significantly expands the application scope of the pEDFM framework.

Finally, it should be noted that the above implementation examples are only used to illustrate the technical scheme of the invention rather than to restrict it, although the invention is described in detail with reference to the better implementation example. The ordinary technical personnel in this field should understand that they can still modify or replace the technical scheme of the invention, and these modifications or equivalent substitutions can not make the modified technical scheme out of the spirit and scope of the technical scheme of the invention.

What is claimed is:

1. A method for generating flow simulation of fracture formation, for an anisotropic media with full permeability tensor, by a projection-based embedded discrete fracture model (pEDFM) using a hybrid of two-point flux approximation (TPFA) method and mimetic finite difference (MFD) method, i.e., (TPFA-MFD) method, the method comprising:
   discretizing of a generic fracture model of the anisotropic media, by a data processing system, for:
      identifying a plurality of grids comprising matrix grids and fracture grids based on a location of each grid in the generic fracture model;
      identifying three types of connections in a fracture network based on the location of each grid in the generic fracture model, wherein the three types of connections comprises:
         m-m connection corresponding to connection between two matrix grids;
         m-f connection corresponding to connection between a matrix grid and a fracture grid; and
         f-f connection corresponding to a connection between two fracture grids; and
      identifying effective m-m connections and/or effective m-f connections, wherein each effective m-m connection and/or each effective m-f connection comprises at least one low-conductivity fracture $f_l$;
   constructing a treatment method for each low-conductivity fracture by the data processing system, for:
      identifying an inter-grid connection set $Cont_1$ comprising a set of connections obtained from a generic pEDFM to treat the low-conductivity fractures with a non-projection transmissibility multiplier method is used that provides a flow area between adjacent grids, wherein the low-conductivity fractures are ignored;
      identifying an efficient set of connections $Cont_1^{\mathit{eff}}$ based on the inter-grid connection set $Cont_1$ as follows:

$$Cont_1^{\mathit{eff}} = Cont_1 - Cont_1^0 \tag{6}$$

wherein $Cont_1^0$ is a set of connections with a flow area 0 in the inter-grid connection set $Cont_1$;
   constructing a numerical flux calculation method for effective m-f and m-m connections, by the data processing system, for:
      determining flux continuity conditions of effective m-f and m-m connections using the hybrid TPFA-MFD method, wherein the hybrid TPFA-MFD method comprises:
         estimating a numerical flux on each effective m-f connection and/or effective m-m connection related to K-orthogonal grids using TPFA method; and
         estimating a numerical flux on each effective m-f connection and/or effective m-m connection related to non-K-orthogonal grids using MFD method; and
      performing a spatial discretization of a continuity equation of each matrix grid and each fracture grid in the effective m-m and m-f connections; and
   constructing global equations, by the data processing system, by combining the flux continuity conditions of the effective m-f and m-m connections and a time discretization scheme of implicit backward Euler scheme, and calculating distribution of pressure and water saturation by solving the global equations using a nonlinear solver based on Newton-Raphson method.

2. The method for generating the flow simulation of fracture formation, for the anisotropic media with full permeability tensor, by the projection-based embedded discrete fracture model (pEDFM) using hybrid of two-point flux approximation and mimetic finite difference (TPFA-MFD) method according to claim 1, wherein the method for constructing the treatment method for each of the low-conductivity fractures by the data processing system comprises, determining a transmissibility of each fracture grid in pEDFM based on TPFA method, wherein the at least one low-conductivity fracture $f_l$ has a permeability $k_{f_l}$ and a fracture width $w_{f_l}$ wherein determining transmissibility of fracture grids in the pEDFM includes determining the transmissibility in three types of connections that are affected by low-conductivity fractures, wherein the transmissibility based on low-conductivity fractures for the three types of connections are as follows:
   (1) for f-f connections, set to connect between i-th fracture grid $f_i$ and j-th fracture grid $f_j$, determining a transmissibility of fracture grids in $f_i$-$f_j$ connection that is affected by low-conductivity fracture $f_l$ comprises:
      determining a first transmissibility of $f_i$-$f_j$ connection before being affected by the low-conductivity fracture grid $f_l$ as:

$$T_{f_i f_j} = (T_{f_i}^{-1} + T_{f_j}^{-1}) \tag{1}$$

wherein, $T_{f_i}$ is a transmissibility of fracture grid $f_i$, $T_{f_j}$ is a transmissibility of fracture grid $f_j$; and
   determining a transmissibility of $f_i$-$f_j$ connection after being affected by low-conductivity fracture $f_l$ as:

$$T_{f_i f_j} = \left(T_{f_i f_j}^{-1} + T_{f_l}^{-1}\right)^{-1}, \text{ wherein } T_{f_l} = \frac{k_{f_l} A(f_i, f_j)}{\dfrac{w_{f_l}}{2}} \tag{2}$$

wherein, $k_{f_l}$ is a permeability of fracture grid $f_l$, $w_{f_l}$ is a width of an opening of fracture grid $f_l$, $A_{(f_i, f_j)}$ is a flow area of $(f_i, f_j)$; and
   updating the transmissibility $T_{f_i f_j}$ using the Eq. (1) if other low-conductivity fractures $f_n$ that affect the f-f connections exist, wherein, for the low-conductivity fracture grid $f_n$ that intersects $(f_i, f_j)$ connection, the transmissibility is further updated based on Equation (2) as:

$$T_{f_i f_j} = \left(T_{f_i f_j}^{-1} + T_{f_n}^{-1}\right)^{-1}, \tag{2}$$

(2) for m-f connections, set to connection between i-th matrix grid $m_i$ and j-th fracture grid $f_j$, determining a transmissibility of fracture grid in $m_i$-$f_j$ connection that is affected by low-conductivity fracture $f_l$ comprises:

identifying the transmissibility of j-th fracture grid $f_j$ in $m_i$-$f_j$ connections not affected by low-conductivity fracture grid $f_l$ based on the transmissibility $T_{fj}$ obtaining the transmissibility $T_{fj}$ of j-th fracture grid $f_j$ after applying the effect of low-conductivity fracture $f_l$ is-applied to the j-th fracture grid $f_j$, which is equivalent to the series connection of low-conductivity fractures $f_1$ and $f_j$, wherein, the transmissibility $T_{fj}$ of fracture grid $f_j$ is updated as:

$$T_{fj} = (T_{fj}^{-1} + T_{fl}^{-1})^{-1} \quad (3); \text{ and}$$

updating the transmissibility Td using Eq. (3) if other low-conductivity fractures $f_n$ that affect the $m_i$-$f_j$ connections exist, wherein for the other low-conductivity fracture grid $f_n$ that intersect with $m_i$-$f_j$ connection, the transmissibility $T_{fj}$ is further updated based on Equation (3) as follows; and (3) for m-m connections, set to connection between i-th matrix grid $m_i$ and j-th matrix grid $m_j$, determining a transmissibility of fracture grid in the $m_i$-$m_j$ connections that is affected by low-conductivity fracture $f_l$ comprises:

splitting the $m_i$-$m_j$ connections into $m_i$-$f_l$ connections and $m_j$-$f_l$ connections, wherein, flow area of $m_i$-$f_l$ connections and $m_j$-$f_l$ connections is same as a flow area $A_{(mi, mj)}$ of $(m_i, m_j)$, wherein a transmissibility of the low conductivity fracture fi is as follows:

$$T'_{f_l} = \frac{k_{f_l} A_{(m_i,m_j)}}{\frac{w_{f_l}}{2}} \quad (4)$$

and updating the transmissibility $T_{fj}$ of the low-conductivity fracture $f_l$ using Eq. (3) if other low-conductivity fractures $f_k$ that affect $(m_i, m_j)$ exist, wherein the transmissibility of the low-conductivity fracture $f_l$ is updated by using a transmissibility of the other low-conductivity fracture $f_k$ in Eq. (3) as follows:

$$T_{f_l} = (T_{f_l}^{-1} + T_{f_k}^{-1})^{-1}, \text{ wherein } T_{f_k} = \frac{k_{f_k} A(m_i m_j)}{\frac{w_{f_k}}{2}}. \quad (5)$$

3. The method for generating flow simulation of fracture formation, for the anisotropic media with full permeability tensor, by the projection-based embedded discrete fracture model (pEDFM) using hybrid of two-point flux approximation and mimetic finite difference (TPFA-MFD) method according to claim 1, wherein constructing the numerical flux calculation method for the effective m-f and m-m connections, by the data processing system comprises:

identifying a number set of a matrix grid which is adjacent to a matrix grid $m_i$ to be $\text{neigh}_{m_i}$, wherein a set of effective connections on each $m_i$-side face of matrix grid $m_i$ is: $\text{Cont}_2^{eff}(m_i) = \bigcup_{j \in neigh_m^i} \text{Cont}_2^{eff}(l_{ij}^{m_i})$ according to Eq. (7):

$$\bar{p}_{l_{ij}}^{m_i} = \frac{\sum_{\xi \in Cont_2^{eff}(l_{ij}^{m_i})} p_\xi A_\xi}{\sum_{\xi \in Cont_2^{eff}(l_{ij}^{m_i})} A_\xi} \quad (7)$$

wherein:
$l_{ij}^{m_i}$ is the $m_i$-side of $l_{ij}$, wherein $l_{ij}$ is the interface between matrix grid $m_i$ and matrix grid $m_j$,
$\text{Cont}_2^{eff}(m_i)$ denotes the set of connections in $\text{Cont}_2^{eff}$ that have additional pressure degree of freedom located on all $m_i$-side faces of matrix grid $m_i$ in addition to $\text{Cont}_1^{eff}$,
$\text{Cont}_2^{eff}(l_{ij}^{m_i})$ denotes the set of connections in $\text{Cont}_2^{eff}$ that have additional pressure degree of freedom is located on $l_{ij}^{m_i}$ in addition to $\text{Cont}_1^{eff}$,
$\bar{p}_{l_{ij}}^{m_i}$ is an average pressure of a side near matrix grid $m_i$ on intersecting face of matrix grids $m_i$ and $m_j$,
$p_\zeta$ is a pressure degree of freedom added by $\zeta$th connection in $\text{Cont}_2^{eff}(l_{ij}^{m_i})$, and
$A_\zeta$ is a flow area of the $\zeta$th connection in $\text{Cont}_2^{eff}(l_{ij}^{m_i})$;

obtaining a conversion formula between the average pressure of $m_i$-side of $m_i$-faces and the value of the pressure degree of freedom added by each connection in $\text{Cont}_2^{eff}(m_i)$ as follows:

$$\bar{p}m_i = A p_{m_i} \quad (8)$$

wherein:
$\bar{p}_{m_i}$ is a column vector composed of $\bar{p}_{ij}^{m_i}$ ($j \in \text{neigh}_{m_i}$),
$\bar{p}_{ij}^{m_i}$ is the average pressure of $l_{ij}^{m_i}$,
$p_{ij}^{m_i}$ is a column vector composed of $p_j$ ($j \in \text{Cont}_2^{eff}(m_i)$) wherein, if $j \in \text{Cont}_2^{eff}$, $(m_i)$ is a connection in $\text{Cont}_2^{eff}(m_i)$, then $p_j$ denotes the added pressure degree of freedom for this connection, and
each j-line of A represents an area weight when using Eq. (7) to calculate the average pressure on $l_{ij}^{m_i}$ (i.e., the $m_i$-side of the j-th surface of $m_i$).

4. The method for generating flow simulation of fracture formation, for the anisotropic media with full permeability tensor, by the projection-based embedded discrete fracture model (pEDFM) using hybrid of two-point flux approximation and mimetic finite difference (TPFA-MFD) method according to claim 3, wherein, constructing the numerical flux calculation method for the effective m-f and m-m connections, by the data processing system comprises:

using a distribution matrix $A^T$ to relate a numerical flux on each surface of $m_i$ denoted by $\text{flux}_i$ to a numerical flux $\overline{\text{flux}}_i$ on each effective connection in $\text{Cont}_2^{eff}(m_i)$ as follows:

$$\text{flux}_i = A^T \overline{\text{flux}}_i \quad (9),$$

wherein:
if the matrix grid $m_i$ is K orthogonal, then a transmissibility matrix $T^{m_i}$ in the i-th matrix grid $m_i$ is calculated by using Eq. (10) based on TPFA as follows:

$$T_{\beta,\gamma}^{m_i} = \begin{cases} T_{i\beta} \text{ if } \beta = \gamma \\ 0 \text{ if } \beta \neq \gamma \end{cases}, \text{ wherein } T_{i\beta} = |\partial \Omega_{i\beta}| \frac{K_i r_{i\beta}}{|r_{i\beta}|^2} \cdot n_{i\beta} \quad (10)$$

wherein:
$T_{\beta,\gamma}^{m_i}$ represents $\beta$ row and $\gamma$ column of matrix $T^{m_i}$,
$\partial \Omega_{i\beta}$ is portion of a control region of grid $m_i$ at $\beta$-th row and $\gamma$-th column of the transmissibility matrix $T_{\beta,\gamma}^{m_i}$,
$|\partial \Omega_{i\beta}|$ is volume of the portion of the control region of grid $m_i$ at $\beta$-th row and $\gamma$-th column of the transmissibility matrix $T_{\beta,\gamma}^{m_i}$, $r_{i\beta}$ is a vector from grid i-center to grid $\partial\Omega_{i\beta}$-center, and $\eta_{i\beta}$ is a unit outward normal vector of $\partial\Omega_{i\beta}$; and if the matrix grid $m_i$ is non-K orthogonal, then the transmissibility matrix $T^{m_i}$ in $m_i$ is calculated by using Eq. (11) based on MFD as follows:

$$T_{i1} = \frac{1}{|\Omega_i|} N_i K_i N_i^T T_{i2} = \frac{6}{d} tr(K_i) A_i (I_i - Q_i Q_i^T) A_i \quad (11)$$

wherein:

$\Omega_i$ is a control region of matrix grid $m_i$, $|\Omega_i|$ is a volume of matrix grid $m_i$, $K_i$ is a permeability tensor of matrix grid $m_i$, $X_i = (x_{i1} - x_i, \ldots, x_{i\beta} - x_i, \ldots, x_{in_i} - x_i)^T$, $x_i$ is a vector of the center of grid i, $x_{i\beta}$ is a vector of $\partial\Omega_{i\beta}$ center, $N_i = (|\partial\Omega_{i1}|\eta_{i1}, \ldots, |\partial\Omega_{i\beta}|\eta_{i\beta}, \ldots, |\partial\Omega_{in_i}|\eta_{in_i})^T$ wherein $N_i$ is the number of all the interfaces of the i-th grid, d is a grid dimension, tr denotes to calculate the trace of a matrix, $A_i = \text{diag}(|\partial\Omega_{i1}|, \ldots, \partial\Omega_{in_i}|)$, and $Q_i = \text{orth}(A_i X_i)$ wherein $Q_i$ is a standard orthogonal basis for a column space of $A_i X_i$, wherein the number of columns in $Q_i$ is equal to the rank of $A_i X_i$;

using an average pressure to participate in the calculation of the numerical flux $\overline{flux}_i$ on each surface of the matrix grid, as:

$$\overline{flux}_i = T^{m_i} p_{m_i} = T^{m_i} A p_{m_i} = T^{m_i} A (p_{m_i} I - p_{m_i}) \quad (12)$$

wherein:

$\overline{flux}_i$ is a column vector composed of numerical flux on each surface of the matrix grid, each j-line of A represents the area weight when the average pressure on the $m_i$-side of the j-th surface of $m_i$ is calculated by Eq. (8), $A^T$ is a transverse of A and is a distribution matrix to relate the numerical flux on each surface of matrix grid $m_i$ to the flux on each connection in $\text{Cont}_2^{eff}(m_i)$, and I is a column vector with all elements being 1, and its length is equal to the number of effective connections in the matrix grid, obtaining the numerical flux and actual transmissibility matrix on the matrix grid $m_i$ by combining Eq. (9) and Eq. (12), as follows:

$$flux_i = A^T T^{m_i} A (p_{m_i} I - p_{m_i}) \quad (13),$$

wherein $flux_i$ is the numerical flux on the matrix grid $m_i$, and for the matrix grid $m_i$, the actual transmissibility matrix is:

$$\tilde{T}^{m_i} = A^T T^{m_i} A \quad (14).$$

5. The method for generating flow simulation of fracture formation, for the anisotropic media with full permeability tensor, by the projection-based embedded discrete fracture model (pEDFM) using hybrid of two-point flux approximation and mimetic finite difference (TPFA-MFD) method according to claim 4, wherein constructing global equations by the data processing system comprises:

calculating the flow on each connection related to $m_i$ by using the actual transmissibility matrix given in Eq. (14), and obtaining a discrete scheme of the continuity equation in matrix grid $m_i$ as:

$$\sum_{\beta \in \text{Cont}_1^{eff}(m_i)} \frac{k_{r\alpha,i\beta}}{\mu_{\alpha,i\beta} B_{a,i\beta}} \sum_{\gamma \in \text{Cont}_1^{eff}(m_i)} \tilde{T}_{\beta,\gamma}^{m_i} \left( p_{m_i^{t+\Delta t}} - p_\gamma^{t+\Delta t} \right) + Q_a = \quad (15)$$
$$\frac{|\Omega_i|}{\Delta t} \left[ \left( \frac{\phi S_a}{B_a} \right)_{m_i}^{t+\Delta t} - \left( \frac{\phi S_a}{B_a} \right)_{m_i}^t \right]$$

wherein:

$k_{r\alpha,ij}$ is a relative permeability of the $\alpha$-th phase between the matrix grid $m_i$ and the matrix grid $m_j$ according to a single-point upwind scheme, $\mu_{\alpha,ij}$ and $B_{\alpha,ij}$ are viscosity and volume coefficient of the ith phase calculated by an arithmetic average scheme between the matrix grid $m_i$ and the matrix grid $m_j$, respectively, subscript $\beta$ refers to a serial number of an intersection surface of matrix grid $m_i$ and matrix grid $m_j$ in all surfaces of matrix grid $m_i$, $F_{i\beta}$ is an outward normal flux of matrix grid $m_i$ on the $\beta$-th plane, $T_{\beta,\gamma}^{m_i}$ is the $\beta$-th row and $\gamma$-th column of the actual transmissibility matrix $\tilde{T}^{m_i}$, is the surface center pressure of the $\gamma$-th plane of the matrix grid $m_i$, is a body center pressure of matrix grid $m_i$, $\Delta t$ is a time stepping, $\phi_i$, $S_{\alpha,i}$ and $B_{\alpha,i}$ are a porosity of matrix grid $m_i$, a saturation of $\alpha$-th phase and the volume coefficient of $\alpha$-th phase, respectively, and superscripts $t+\Delta t$ and t represent the time; and obtaining a discrete scheme of continuity equation for the fracture grid $f_j$, wherein when the transmissibility is in a simple scheme based on TPFA, the effective connection $\text{Cont}_2^{eff}(f_j)$ related to $f_j$ includes f-f connection $\text{Cont}_{f_j}^{f-f}$ and m-f connection $\text{Cont}_{f_j}^{m-f}$, and if the set of fracture grids adjacent to $f_j$ reflected from $\text{Cont}_{f_j}^{f-f}$ is denoted as $\text{neigh}_{f_j}$, then the discrete scheme of the continuity equation in fracture grid $f_j$ is:

$$\sum_{\beta \in \text{Cont}_{f_j}^{m-f}} \frac{k_{r\alpha,i\beta}}{\mu_{\alpha,i\beta} B_{a,i\beta}} \sum_{\gamma \in \text{Cont}_{f_j}^{m-f}} \tilde{T}_{\beta,\gamma}^{m_i} \left( p_{m_i^{t+\Delta t}} - p_\gamma^{t+\Delta t} \right) + \quad (16)$$
$$\sum_{\beta \in \text{neigh}_{f_j}} \frac{k_{r\alpha,i\beta}}{\mu_{\alpha,i\beta} B_{a,i\beta}} \left( p_{f_j}^{t+\Delta t} - p_\beta^{t+\Delta t} \right) + Q_a = \frac{|\Omega_{f_j}|}{\Delta t} \left[ \left( \frac{\phi S_a}{B_a} \right)_{f_j}^{t+\Delta t} - \left( \frac{\phi S_a}{B_a} \right)_{f_j}^t \right].$$

6. The method for generating flow simulation of fracture formation, for the anisotropic media with full permeability tensor, by the projection-based embedded discrete fracture model using hybrid of two-point flux approximation and mimetic finite difference (TPFA-MFD) method according to claim 5, wherein when actual transmissibility of each matrix grid $\tilde{T}^{m_i}$ is obtained, the transmissibility of all matrix grids in effective m-m connections and m-f connections is known, while a transmissibility of fracture grids in m-f connections still adopts a simple scheme based on TPFA wherein:

for m-m connections, suppose $m_i$ and $m_k$ are matrix grids corresponding to i-th surface and k-th surface respectively, then, the corresponding numerical flux is:

$$flux_{m_i \to m_k} = \tilde{T}_{m_k}^{m_i} (p_{m_i} I - p_{m_i}) flux_{m_k \to m_i} = \tilde{T}_{m_k}^{m_i} (p_{m_i} I - p_{m_i}) \quad (17)$$

the corresponding flux continuity condition is:

$$\tilde{T}_{m_k}^{m_i} (p_{m_i} I - p_{m_i}) + \tilde{T}_{m_k}^{m_i} (p_{m_i} I - p_{m_i}) = 0 \quad (18)$$

for m-f connections, suppose $m_i$ and $f_j$ are the matrix grid corresponding to i-th surface and the fracture grid corresponding to i-th surface respectively, then,
the corresponding numerical flux is:

$$\text{flux}_{m_i \to f_j} = \tilde{T}^{m_i}_{f_j}(p_{m_i} I - p_{m_i}) \text{flux}_{f_j \to m_i} = T_{f_j}(p_{f_j} - p_{(m_i, f_j)}) \quad (19),\text{ and}$$

the corresponding flux continuity condition is:

$$\tilde{T}^{m_i}_{f_j}(p_{m_i} I - p_{m_i}) + T_{f_j}(p_{f_j} - p_{(m_i, f_j)}) = 0 \quad (20); \text{ and}$$

for f-f connections, the transmissibility is obtained using the generic pEDFM without defining additional pressure degrees of freedom is adopted.

* * * * *